(12) United States Patent
Sherman et al.

(10) Patent No.: US 11,286,404 B2
(45) Date of Patent: Mar. 29, 2022

(54) DUAL-SIDED MULTI-LAYER ADHESIVE

(71) Applicant: 3M INNOVATIVE PROPERTIES COMPANY, St. Paul, MN (US)

(72) Inventors: Audrey A. Sherman, Woodbury, MN (US); Eric D. Shockey, Stillwater, MN (US); Joan M. Noyola, Maplewood, MN (US); Krystal K. Hunt, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 367 days.

(21) Appl. No.: 15/537,791

(22) PCT Filed: Dec. 16, 2015

(86) PCT No.: PCT/US2015/066032
§ 371 (c)(1),
(2) Date: Jun. 19, 2017

(87) PCT Pub. No.: WO2016/106040
PCT Pub. Date: Jun. 30, 2016

(65) Prior Publication Data
US 2017/0362469 A1  Dec. 21, 2017

Related U.S. Application Data

(60) Provisional application No. 62/095,958, filed on Dec. 23, 2014.

(51) Int. Cl.
*C09J 7/10* (2018.01)
*C09J 7/38* (2018.01)
(Continued)

(52) U.S. Cl.
CPC ...... *C09J 7/10* (2018.01); *B32B 7/06* (2013.01); *B32B 7/12* (2013.01); *C08G 77/455* (2013.01);
(Continued)

(58) Field of Classification Search
CPC .......... C08G 77/54; C08G 77/455; C09J 7/10; C09J 7/22; C09J 7/403; C09J 7/38;
(Continued)

(56) References Cited

U.S. PATENT DOCUMENTS 4,351,686 A * 9/1982 Clark .................. B32B 25/04
156/329
4,737,559 A    4/1988 Kellen
(Continued)

FOREIGN PATENT DOCUMENTS

WO   WO 1996-034028   10/1996
WO   WO 1996-034030   10/1996
(Continued)

OTHER PUBLICATIONS

International Search Report for PCT International Application No. PCT/US2015/066032, dated Apr. 4, 2016, 4 pages.

*Primary Examiner* — Scott R. Walshon

(57) ABSTRACT

Dual-sided adhesive articles include a first crosslinked pressure sensitive adhesive layer with a first major surface and a second major surface, a second siloxane-based pressure sensitive adhesive layer with a first major surface and a second major surface, such that the first major surface of the second siloxane-based pressure sensitive adhesive layer is in contact with the second major surface of the first crosslinked pressure sensitive adhesive layer. The articles also include a release liner having a microstructured surface with an array of microstructures, where the microstructured surface is in contact with the second major surface of the second siloxane-based pressure sensitive adhesive layer. The microstructures of the microstructured surface of the second siloxane-based pressure sensitive adhesive layer are unstable when not in contact with the microstructured release liner, and disappear over time when in contact with a substrate.

22 Claims, 2 Drawing Sheets

(51) Int. Cl.
    *C09J 7/40*      (2018.01)
    *C09J 7/22*      (2018.01)
    *B32B 7/06*      (2019.01)
    *B32B 7/12*      (2006.01)
    *C08G 77/455*    (2006.01)
    *C08G 77/54*     (2006.01)

(52) U.S. Cl.
    CPC ............... *C08G 77/54* (2013.01); *C09J 7/22* (2018.01); *C09J 7/38* (2018.01); *C09J 7/403* (2018.01); *B32B 2307/412* (2013.01); *B32B 2405/00* (2013.01); *C09J 2301/1242* (2020.08); *C09J 2301/208* (2020.08); *C09J 2433/00* (2013.01); *C09J 2433/006* (2013.01); *C09J 2483/00* (2013.01); *C09J 2483/006* (2013.01)

(58) Field of Classification Search
    CPC ............. C09J 2201/134; C09J 2433/00; C09J 2483/00; C09J 2483/006; C09J 2201/606; C09J 183/10; C09J 133/08; C09J 121/00; C09J 2301/208
    See application file for complete search history.

(56) References Cited

U.S. PATENT DOCUMENTS

| | | | |
|---|---|---|---|
| 4,839,206 A * | 6/1989 | Waldenberger | C09J 7/38 428/41.5 |
| 4,900,474 A | 2/1990 | Tarae | |
| 5,028,679 A | 7/1991 | Tarae | |
| 5,118,775 A | 6/1992 | Inomata | |
| 5,122,902 A | 6/1992 | Benson | |
| 5,214,119 A | 5/1993 | Leir | |
| 5,223,465 A | 6/1993 | Ueki | |
| 5,236,997 A | 8/1993 | Fujiki | |
| RE34,605 E | 5/1994 | Schrenk | |
| 5,360,659 A | 11/1994 | Arends | |
| 5,461,134 A | 10/1995 | Leir | |
| 5,506,279 A | 4/1996 | Babu | |
| 5,512,650 A | 4/1996 | Leir | |
| 5,527,578 A | 6/1996 | Mazurek | |
| 5,579,162 A | 11/1996 | Bjornard | |
| 5,639,305 A | 6/1997 | Brown | |
| 5,741,549 A | 4/1998 | Maier | |
| 5,759,274 A | 6/1998 | Maier | |
| 5,858,545 A | 1/1999 | Everaerts | |
| 5,882,774 A | 3/1999 | Jonza | |
| 6,007,914 A | 12/1999 | Joseph | |
| 6,049,419 A | 4/2000 | Wheatley | |
| 6,083,856 A | 7/2000 | Joseph | |
| 6,720,025 B2 | 4/2004 | Yapel | |
| 7,097,673 B2 | 8/2006 | Dudley | |
| 7,153,924 B2 | 12/2006 | Kuepfer | |
| 7,927,703 B2 | 4/2011 | Xia | |
| 8,765,881 B2 | 7/2014 | Hays | |
| 2007/0009748 A1* | 1/2007 | Takanami | B32B 25/20 428/447 |
| 2007/0148475 A1 | 6/2007 | Sherman | |
| 2007/0212535 A1 | 9/2007 | Sherman | |
| 2009/0110861 A1 | 4/2009 | Sherman | |
| 2011/0020640 A1* | 1/2011 | Sherman | C09J 7/403 428/343 |
| 2011/0064916 A1* | 3/2011 | Sherman | C09J 7/38 428/172 |
| 2011/0126968 A1* | 6/2011 | Determan | C09J 7/243 156/229 |
| 2012/0271025 A1 | 10/2012 | Hays | |
| 2013/0004749 A1* | 1/2013 | Hao | B32B 7/10 428/201 |
| 2013/0316076 A1 | 11/2013 | Sherman | |
| 2016/0152869 A1* | 6/2016 | Rattray | C09J 7/38 428/195.1 |

FOREIGN PATENT DOCUMENTS

| | | |
|---|---|---|
| WO | WO 1996-035458 | 11/1996 |
| WO | WO 1997-040103 | 10/1997 |
| WO | WO 1998-017726 | 4/1998 |
| WO | WO 2000-002966 | 1/2000 |
| WO | WO 2012-027377 | 3/2012 |
| WO | WO 2014-197194 | 12/2014 |
| WO | WO 2014-197368 | 12/2014 |

* cited by examiner

DUAL-SIDED MULTI-LAYER ADHESIVE

FIELD OF THE DISCLOSURE

The present disclosure relates generally to the field of adhesives, specifically to the field of dual-sided multi-layer pressure sensitive adhesives and tapes and articles prepared therefrom.

BACKGROUND

Adhesives have been used for a variety of marking, holding, protecting, sealing and masking purposes. Adhesive tapes generally comprise a backing, or substrate, and an adhesive. One type of adhesive, a pressure sensitive adhesive, is particularly preferred for many applications.

Pressure sensitive adhesives are well known to one of ordinary skill in the art to possess certain properties at room temperature including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as pressure sensitive adhesives are polymers designed and formulated to exhibit the requisite viscoelastic properties resulting in a desired balance of tack, peel adhesion, and shear strength. The most commonly used polymers for preparation of pressure sensitive adhesives are natural rubber, synthetic rubbers (e.g., styrene/butadiene copolymers (SBR) and styrene/isoprene/styrene (SIS) block copolymers), various (meth)acrylate (e.g., acrylate and methacrylate) copolymers and silicones. Each of these classes of materials has advantages and disadvantages.

A variety of different pressure sensitive adhesive articles with different properties have been developed. Among the pressure sensitive adhesives that include a single layer of pressure sensitive adhesive are U.S. Pat. No. 7,927,703 (Xia et al.) which includes adhesive compositions containing a mixture of a pressure sensitive adhesive, a high Tg polymer, and a crosslinker to form a compatibilized blend that is optically clear, and U.S. Pat. No. 8,765,881 (Hays et al.) which describes methods of preparing polydiorganosiloxane polyoxamide copolymers that have at least one polydiorganosiloxane segment and at least two aminooxalylamino groups.

Among the single layer pressure sensitive adhesive articles are ones that have a structured or microstructured surface. Examples of such articles include U.S. Patent Publication No. 2007/0212535 (Sherman et al.) which describes a method of making a microstructured adhesive article that includes (a) providing an article comprising a crosslinked pressure sensitive adhesive layer disposed on a backing; and (b) embossing the surface of the crosslinked pressure sensitive adhesive layer to form a crosslinked pressure sensitive adhesive layer having a microstructured adhesive surface, and the pending applications Ser. Nos. 61/831,761 and 61/831,766 filed Jun. 6, 2013 which describe methods of forming laminating adhesive articles that include providing a multi-layer article, and a tool with a structured surface. The multi-layer articles include a substrate, an adhesive layer, and a liner or may just include an adhesive layer and a liner. The multi-layer article is placed between the structured surface of the tool and a support surface and the tool is embossed against the liner by applying pressure or a combination of pressure and heat. The embossing causes the structures on the surface of the tool to distort the liner and the adhesive layer but does not distort the substrate. The distortion in the liner is retained upon release of the applied pressure. Upon removal of the liner from the adhesive layer, the structures on the adhesive layer are unstable, but do not immediately collapse.

Among the pressure sensitive adhesive articles that include multiple layers of pressure sensitive adhesive are U.S. Patent Publication No. 2009/0110861 (Sherman) which describes articles including a substrate, a first layer adjacent to the substrate, the first layer having a silicone-containing pressure sensitive adhesive and a thickness of less than about 5 micrometers, and a second layer adjacent the first layer and opposite the substrate, the second layer having a pressure sensitive adhesive. The silicone-containing pressure sensitive adhesive can include a copolymer of a vinyl polymeric backbone having polysiloxane moieties grafted thereto, and U.S. Patent Publication No. (Dudley et al.) which describes methods for preparing double-sided multi-layer adhesives. The methods include providing a first fluid, the first fluid including a polymeric adhesive composition solution or dispersion, providing a second fluid, the second fluid including a curable composition, coating the first fluid and the second fluid onto a substrate, and curing the curable composition to form a double-sided multi-layer adhesive. The coating of the first fluid and the second fluid onto a substrate may include simultaneous slot die coating of the two fluids or sequential coating of the two fluids. The curable composition layer is cured to form a multi-layer adhesive article.

SUMMARY

Disclosed herein are dual-sided adhesive articles and methods for preparing and using them. In some embodiments, the dual-sided adhesive article comprises a first crosslinked pressure sensitive adhesive layer with a first major surface and a second major surface, a second siloxane-based pressure sensitive adhesive layer with a first major surface and a second major surface, such that the first major surface of the second siloxane-based pressure sensitive adhesive layer is in contact with the second major surface of the first crosslinked pressure sensitive adhesive layer. The articles also include a release liner having at least one surface comprising a microstructured surface that comprises an array of microstructures, where the microstructured surface is in contact with the second major surface of the second siloxane-based pressure sensitive adhesive layer. The first crosslinked pressure sensitive has a first surface energy, and the second siloxane-based pressure sensitive adhesive has a second surface energy, and the first surface energy is lower than the second surface energy. The microstructures of the microstructured surface of the second siloxane-based pressure sensitive adhesive layer are unstable when not in contact with the microstructured release liner, and disappear over time when in contact with a substrate.

Also disclosed are methods of preparing adhesive laminates. In some embodiments, the method comprises providing a dual-sided adhesive article, where the dual-sided adhesive article is described above, removing the microstructured release liner from the second major surface of the second siloxane-based pressure sensitive adhesive layer, and contacting the exposed second major surface of the second siloxane-based pressure sensitive adhesive layer, which comprises a microstructured surface, to a first substrate. As mentioned above, the microstructures of the microstructured surface of the second siloxane-based pressure sensitive adhesive layer are unstable when not in contact with the microstructured release liner, and disappear over time when in contact with the first substrate.

In some embodiments, the method of providing a dual-sided adhesive article comprises forming a first crosslinked pressure sensitive adhesive layer comprising a first major surface and second major surface, coating a mixture comprising the second siloxane-based pressure sensitive adhesive and at least one solvent onto the second major surface of the first crosslinked pressure sensitive adhesive layer, drying the mixture comprising the second siloxane-based pressure sensitive adhesive and at least one solvent to form the second siloxane-based pressure sensitive adhesive layer comprising a first major surface and a second major surface such that the first major surface is in contact with the second major surface of the first crosslinked pressure sensitive adhesive layer, and contacting a release liner to the second major surface of the second siloxane-based pressure sensitive adhesive layer. In some embodiments the release liner comprises a microstructured release liner comprising at least one microstructured surface that comprises an array of microstructures, where the microstructured surface is in contact with the second major surface of the second siloxane-based pressure sensitive adhesive layer. In other embodiments, the release liner comprises a first major surface and a second major surface where the first major surface is in contact with the second major surface of the second siloxane-based pressure sensitive adhesive layer and both the first and the second major surfaces are flat, and contacting the second major surface of the release liner to a microstructuring tool which impresses a microstructured pattern through the release liner and into at least the second siloxane-based pressure sensitive adhesive layer.

In other embodiments, the method of providing a dual-sided adhesive article comprises a multilayer coating method comprising providing a first coating fluid, providing a second coating fluid, moving a release liner along a path through a coating station, flowing the first coating fluid at a rate sufficient to form a continuous flowing layer towards the substrate, flowing the second coating fluid onto the continuous flowing layer thereby forming a composite flowing layer, contacting the substrate with the composite flowing layer such that the second coating fluid is interposed between the continuous flowing layer and the substrate, and forming the composite flowing layer into a film after the composite flowing layer contacts the substrate. The film comprises a first coating layer formed from the first coating fluid and a second coating layer formed from the second coating fluid, where the first coating layer comprises a crosslinked pressure sensitive adhesive layer, and the second coating layer comprises a siloxane-based pressure sensitive adhesive layer. After the film is formed, the exposed surface of the release liner is contacted to a microstructuring tool and pressing the microstructured pattern of the microstrucuturing tool through the release liner and into at least the second coating layer.

BRIEF DESCRIPTION OF THE DRAWINGS

The present application may be more completely understood in consideration of the following detailed description of various embodiments of the disclosure in connection with the accompanying drawings.

Figure 1A:
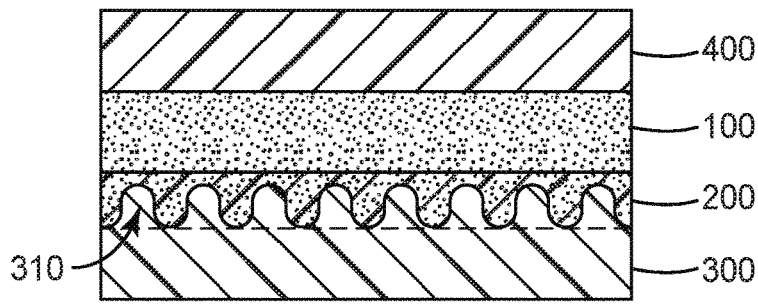
FIG. 1A and FIG. 1B show cross-sectional views of embodiments of dual-sided multi-layer adhesive articles of this disclosure.

In the following description of the illustrated embodiments, reference is made to the accompanying drawings, in which is shown by way of illustration, various embodiments in which the disclosure may be practiced. It is to be understood that the embodiments may be utilized and structural changes may be made without departing from the scope of the present disclosure. The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Dual-sided tapes, also called "transfer tapes" are adhesive tapes that have adhesive on both exposed surfaces. In some transfer tapes, the exposed surfaces are simply the two surfaces of a single adhesive layer. Other transfer tapes are multi-layer transfer tapes with at least two adhesive layers that may be the same or different, and in some instances intervening layers that may not be adhesive layers. For example, a multi-layer transfer tape may be a 3 layer construction with an adhesive layer, a film layer and another adhesive layer. The film layer can provide handling and/or tear strength or other desirable properties. In this disclosure, multi-layer dual-sided adhesives are prepared that comprise at least two layers of pressure sensitive adhesive. The two layers of pressure sensitive adhesive are different, and there are no intervening layers. One of the layers is a crosslinked pressure sensitive adhesive layer and the other is siloxane-based pressure sensitive adhesive layer.

Having two different types of pressure sensitive adhesive layers in the transfer tape provides a variety of advantages as well as a variety of challenges. Among the advantages of transfer tapes having two different types of pressure sensitive adhesive layers is the ability to bond to different types of surfaces, including very different types of surfaces, with a single transfer tape. For example, if one wished to use a transfer tape to bond together a relatively low surface energy substrate (such as a polyolefin substrate) to a relatively high surface energy substrate (such as glass), the use of a transfer tape with only one type of pressure sensitive adhesive may not give a sturdy adhesive bond. However the use of transfer tape with a relatively high surface energy pressure sensitive adhesive in one layer and relatively low surface energy pressure sensitive adhesive in the other layer can provide a sturdy adhesive bond to these two substrates.

Among the challenges of having two different types of pressure sensitive adhesive layers in the transfer tape can include the potential for a weak boundary layer between the two pressure sensitive adhesive layers. By this it is meant that because the two pressure sensitive adhesive layers are different, they may not bond well to each other creating a weak bond between the two pressure sensitive adhesive layers (often called a "weak boundary layer"). This weak boundary layer can be problematic in that it can become a locus of failure when the transfer tape is used to form adhesive bonds.

Another difficulty with transfer tapes is their use with rigid substrates. If one or more of the substrates to be bonded is a rigid substrate, it can be difficult to form a defect free bond, as often air bubbles can form in the bond line when bonds to rigid substrates are formed. The use of heat and/or pressure to squeeze the air bubbles out of the bond line can be problematic with transfer tapes, as the surface to which the pressure is applied is a pressure sensitive adhesive surface and it may or may not be adhered to a substrate.

In this disclosure, multilayer transfer tapes are presented which have two different pressure sensitive adhesives. The transfer tapes are part of dual-sided adhesive articles which comprise a first crosslinked pressure sensitive adhesive layer with a first major surface and a second major surface, and a first surface energy, a second siloxane-based pressure sensitive adhesive layer with a first major surface and a second major surface, a second surface energy, wherein the first major surface of the second siloxane-based pressure sensitive adhesive layer is in contact with the second major surface of the first crosslinked pressure sensitive adhesive layer, and a release liner having at least one surface comprising a microstructured surface that comprises an array of microstructures, where the microstructured surface is in contact with the second major surface of the second siloxane-based pressure sensitive adhesive layer. The first surface energy is lower than the second surface energy.

The microstructured surface is prepared by embossing the surface. As used herein, the term "embossing" means deforming with pressure. The adhesive surface is embossed by contacting the surface with a microstructured release liner or a microstructured molding tool. The U.S. Patent Publication No. 2007/0212535 (Sherman et al.) discloses embossing of a flat, crosslinked adhesive layer to create a microstructured adhesive surface that is unstable when not in contact with the microstructured liner or microstructured molding tool. The embossing of the flat, crosslinked adhesive layer to create the microstructured surface minimizes the formation of stresses within the adhesive after lamination because both the pre-structured and final states of the adhesive are substantially planar. Therefore, the structure is unstable when not in contact with the microstructured liner or molding tool. This is in contrast to microstructured adhesives produced by coating a flowable adhesive onto a microstructured release liner or a microstructured molding tool, where the initial state of the adhesive to which it tries to return is that of the microstructured configuration, while the final state is substantially planar. In the present disclosure, rather than embossing a crosslinked adhesive layer to create a microstructured surface that is unstable when not in contact with the microstructured release liner or a microstructured molding tool, a non-crosslinked adhesive layer coated on a crosslinked adhesive layer is embossed. Surprisingly, even though the adhesive layer is not crosslinked, the same rebound phenomenon is observed. By rebound it is meant the effect where a planar surface that has been embossed, upon removal of the embossing agent (microstructured release liner or a microstructured molding tool), the embossed structure is unstable and spontaneously begins to revert to the planar state without the application of an outside force such as heat and/or applied pressure. This rebound effect is particularly desirable in optical applications, as the presence of microstructures in the adhesive layer can cause detrimental optical effects. Thus rapid and complete loss of microstructured features from the bond line is very desirable. Adhesive layers that display this rebound effect may require some time for the microstructures to completely disappear, and the use of outside forces such as the application of heat and/or applied pressure can be used if desired, but in general such outside forces is not necessary. As mentioned above, the observation that an adhesive layer that is coated on a crosslinked adhesive layer displays this rebound effect even though the adhesive layer itself is not crosslinked is very surprising. This rebound effect permits the embossing of a non-crosslinked adhesive layer to obtain the desirable effects of microstructuring (such as air egress from the bond line, for example) with the additional desirable effect of rapid disappearance of the microstructured features upon removal of the microstructuring agent (microstructured release liner or a microstructured molding tool).

Disclosed herein are dual-sided adhesive articles comprising a first crosslinked pressure sensitive adhesive layer with a first major surface and a second major surface, and a second siloxane-based pressure sensitive adhesive layer with a first major surface and a second major surface, where the first major surface of the second siloxane-based pressure sensitive adhesive layer is in contact with the second major surface of the first crosslinked pressure sensitive adhesive layer, and a release liner having at least one surface comprising a microstructured surface in contact with the second major surface of the second siloxane-based pressure sensitive adhesive layer, and wherein the first surface energy is lower than the second surface energy. The first crosslinked pressure sensitive adhesive layer has a first surface energy which is different from the surface energy of the siloxane-based pressure sensitive adhesive layer (called the second surface energy). Also disclosed are methods for making and using these dual-sided adhesive articles.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. For example, reference to "a layer" encompasses embodiments having one, two or more layers. As used in this specification and the appended claims, the term "or" is generally employed in its sense including "and/or" unless the content clearly dictates otherwise.

The term "adhesive" as used herein refers to polymeric compositions useful to adhere together two adherends. Examples of adhesives are pressure sensitive adhesives.

Pressure sensitive adhesive compositions are well known to those of ordinary skill in the art to possess properties including the following: (1) aggressive and permanent tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process.

The terms "Tg" and "glass transition temperature" are used interchangeably. If measured, Tg values are determined by Differential Scanning calorimetry (DSC) at a scan rate of 10° C./minute, unless otherwise indicated. Typically, Tg values for copolymers are not measured but are calculated using the well-known Fox Equation, using the monomer Tg values provided by the monomer supplier, as is understood by one of skill in the art The terms "siloxane-based" as used herein refer to polymers or units of polymers that contain siloxane units. The terms silicone or siloxane are used interchangeably and refer to units with dialkyl or diaryl siloxane (—SiR$_2$O—) repeating units.

The term "hydrocarbon group" as used herein refers to any monovalent group that contains primarily or exclusively carbon and hydrogen atoms. Alkyl and aryl groups are examples of hydrocarbon groups.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl.

The term "aryl" refers to a monovalent group that is aromatic and carbocyclic. The aryl can have one to five rings that are connected to or fused to the aromatic ring.

The other ring structures can be aromatic, non-aromatic, or combinations thereof. Examples of aryl groups include, but are not limited to, phenyl, biphenyl, terphenyl, anthryl, naphthyl, acenaphthyl, anthraquinonyl, phenanthryl, anthracenyl, pyrenyl, perylenyl, and fluorenyl.

The term "alkylene" refers to a divalent group that is a radical of an alkane. The alkylene can be straight-chained, branched, cyclic, or combinations thereof. The alkylene often has 1 to 20 carbon atoms. In some embodiments, the alkylene contains 1 to 18, 1 to 12, 1 to 10, 1 to 8, 1 to 6, or 1 to 4 carbon atoms. The radical centers of the alkylene can be on the same carbon atom (i.e., an alkylidene) or on different carbon atoms.

The term "heteroalkylene" refers to a divalent group that includes at least two alkylene groups connected by a thio, oxy, or —NR— where R is alkyl. The heteroalkylene can be linear, branched, cyclic, substituted with alkyl groups, or combinations thereof. Some heteroalkylenes are poloxyyalkylenes where the heteroatom is oxygen such as for example,

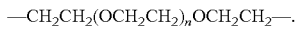

—CH$_2$CH$_2$(OCH$_2$CH$_2$)$_n$OCH$_2$CH$_2$—.

The term "arylene" refers to a divalent group that is carbocyclic and aromatic. The group has one to five rings that are connected, fused, or combinations thereof. The other rings can be aromatic, non-aromatic, or combinations thereof. In some embodiments, the arylene group has up to 5 rings, up to 4 rings, up to 3 rings, up to 2 rings, or one aromatic ring. For example, the arylene group can be phenylene.

The term "heteroarylene" refers to a divalent group that is carbocyclic and aromatic and contains heteroatoms such as sulfur, oxygen, nitrogen or halogens such as fluorine, chlorine, bromine or iodine.

The term "aralkylene" refers to a divalent group of formula —R$^a$—Ar$^a$— where R$^a$ is an alkylene and Ar$^a$ is an arylene (i.e., an alkylene is bonded to an arylene).

The term "(meth)acrylate" refers to monomeric acrylic or methacrylic esters of alcohols. Acrylate and methacrylate monomers or oligomers are referred to collectively herein as "(meth)acrylates".

The terms "free radically polymerizable" and "ethylenically unsaturated" are used interchangeably and refer to a reactive group which contains a carbon-carbon double bond which is able to be polymerized via a free radical polymerization mechanism.

Unless otherwise indicated, "optically transparent" refers to an article, film or adhesive that has a high light transmittance over at least a portion of the visible light spectrum (about 400 to about 700 nm). An optically transparent article may have visible light transmittance of 90% or more. The term "transparent film" refers to a film having a thickness and when the film is disposed on a substrate, an image (disposed on or adjacent to the substrate) is visible through the thickness of the transparent film. In many embodiments, a transparent film allows the image to be seen through the thickness of the film without substantial loss of image clarity. In some embodiments, the transparent film has a matte or glossy finish.

Unless otherwise indicated, "optically clear" refers to an adhesive or article that has a high light transmittance over at least a portion of the visible light spectrum (about 400 to about 700 nm), and that exhibits low haze. Optically clear articles have visible light transmittance of at least 95%, and in some instances as high as 98%, or even higher.

Disclosed herein are dual-sided adhesive articles comprising a first crosslinked pressure sensitive adhesive layer with a first major surface and a second major surface, and a second siloxane-based pressure sensitive adhesive layer with a first major surface and a second major surface, where the first major surface of the second siloxane-based pressure sensitive adhesive layer is in contact with the second major surface of the first crosslinked pressure sensitive adhesive layer, and a release liner having at least one surface comprising a microstructured surface in contact with the second major surface of the second siloxane-based pressure sensitive adhesive layer, and wherein the first surface energy is lower than the second surface energy. The first crosslinked pressure sensitive adhesive layer has a first surface energy which is different from the surface energy of the siloxane-based pressure sensitive adhesive layer (called the second surface energy). This difference in surface energies permits the dual-sided adhesive article to adhere to two different substrates with different surface energies.

In some embodiments, the dual-sided adhesive article has desirable optical properties. In some embodiments the first crosslinked pressure sensitive adhesive layer and the second siloxane-based pressure sensitive adhesive layer are optically transparent, or even optically clear.

The dual-sided adhesive article includes a first crosslinked pressure sensitive adhesive layer. The crosslinked pressure sensitive adhesive layer may contain a single polymeric material or may contain a blend of polymeric materials. The crosslinked pressure sensitive adhesive layer can contain ionic crosslinks, covalent crosslinks, or a combination thereof. By ionic crosslinks, it is meant that the pressure sensitive adhesive comprises a polymeric blend of at least two polymers containing complimentary ionic groups that form an ionic interaction, as is explained below. Typically, ionically crosslinked pressure sensitive adhesive compositions include at least one polymer with either an acid or base functionality that is a pressure sensitive adhesive polymer, and a high Tg polymer with an acid or base functionality, where the functionality on the pressure sensitive adhesive polymer and the high Tg polymer cause an acid-base interaction that forms a compatibilized blend. By the term "pressure sensitive adhesive polymer" it is meant that the polymer by itself can be used as a pressure sensitive adhesive, but the term does not exclude blends of polymers or one or more polymers with additives such as tackifying agents or plasticizing agents. By covalent crosslinks, it is meant that a covalent chemical bonds are present between polymers to form a polymeric matrix.

Examples of crosslinked pressure sensitive adhesives that contain a single polymeric material include (meth)acrylate-based pressure sensitive adhesives and rubber-based pressure sensitive adhesives. Particularly suitable crosslinked pressure sensitive adhesives are (meth)acrylate-based pressure sensitive adhesives. In general two general classes of crosslinked (meth)acrylate-based pressure sensitive adhesives are useful, those that include covalent crosslinks and those that include ionic crosslinks and may also have covalent crosslinks. Each of these general classes is described below.

Particularly suitable covalently crosslinked (meth)acrylate-based pressure sensitive adhesives include copolymers derived from: (A) at least one monoethylenically unsaturated alkyl (meth) acrylate monomer (i.e., alkyl acrylate and alkyl methacrylate monomer); and (B) at least one monoethylenically unsaturated free-radically copolymerizable reinforcing monomer. The reinforcing monomer has a homopolymer glass transition temperature (Tg) higher than that of the alkyl (meth)acrylate monomer and is one that increases the glass transition temperature and cohesive strength of the resultant copolymer. Herein, "copolymer" refers to polymers containing two or more different monomers, including terpolymers, tetrapolymers, etc.

Monomer A, which is a monoethylenically unsaturated alkyl acrylate or methacrylate (i.e., (meth)acrylic acid ester), contributes to the flexibility and tack of the copolymer. Generally, monomer A has a homopolymer Tg of no greater than about 0° C. Typically, the alkyl group of the (meth) acrylate has an average of about 4 to about 20 carbon atoms, or an average of about 4 to about 14 carbon atoms. The alkyl group can optionally contain oxygen atoms in the chain thereby forming ethers or alkoxy ethers, for example. Examples of monomer A include, but are not limited to, 2-methylbutyl acrylate, isooctyl acrylate, lauryl acrylate, 4-methyl-2-pentyl acrylate, isoamyl acrylate, sec-butyl acrylate, n-butyl acrylate, n-hexyl acrylate, 2-ethylhexyl acrylate, n-octyl acrylate, n-decyl acrylate, isodecyl acrylate, isodecyl methacrylate, and isononyl acrylate. Other examples include, but are not limited to, poly-ethoxylated or-propoxylated methoxy (meth)acrylates such as acrylates of CARBOWAX (commercially available from Union Carbide) and NK ester AM90G (commercially available from Shin Nakamura Chemical, Ltd., Japan). Suitable monoethylenically unsaturated (meth)acrylates that can be used as monomer A include isooctyl acrylate, 2-ethyl-hexyl acrylate, and n-butyl acrylate. Combinations of various monomers categorized as an A monomer can be used to make the copolymer.

Monomer B, which is a monoethylenically unsaturated free-radically copolymerizable reinforcing monomer, increases the glass transition temperature and cohesive strength of the copolymer. Generally, monomer B has a homopolymer Tg of at least about 10° C. Typically, monomer B is a reinforcing (meth)acrylic monomer, including an acrylic acid, a methacrylic acid, an acrylamide, or a (meth) acrylate. Examples of monomer B include, but are not limited to, acrylamides, such as acrylamide, methacrylamide, N-methyl acrylamide, N-ethyl acrylamide, N-hydroxyethyl acrylamide, diacetone acrylamide, N,N-dimethyl acrylamide, N,N-diethyl acrylamide, N-ethyl-N-aminoethyl acrylamide, N-ethyl-N-hydroxyethyl acrylamide, N,N-dihydroxyethyl acrylamide, t-butyl acrylamide, N,N-dimethyl-aminoethyl acrylamide, and N-octyl acrylamide. Other examples of monomer B include itaconic acid, crotonic acid, maleic acid, fumaric acid, 2,2-(diethoxy)ethyl acrylate, 2-hydroxyethyl acrylate or methacrylate, 3-hydroxypropyl acrylate or methacrylate, methyl methacrylate, isobornyl acrylate, 2-(phenoxy)ethyl acrylate or methacrylate, biphenylyl acrylate, t-butylphenyl acrylate, cyclohexyl acrylate, dimethyladamantyl acrylate, 2-naphthyl acrylate, phenyl acrylate, N-vinyl formamide, N-vinyl acetamide, N-vinyl pyrrolidone, and N-vinyl caprolactam. Particularly suitable reinforcing acrylic monomers that can be used as monomer B include acrylic acid and acrylamide. Combinations of various reinforcing monoethylenically unsaturated monomers categorized as a B monomer can be used to make the copolymer.

Generally, the (meth)acrylate copolymer is formulated to have a resultant Tg of less than about 0° C. and more typically, less than about −10° C. Such (meth)acrylate copolymers generally include about 60 parts to about 98 parts per hundred of at least one monomer A and about 2 parts to about 40 parts per hundred of at least one monomer B. In some embodiments, the (meth)acrylate copolymers have about 85 parts to about 98 parts per hundred or at least one monomer A and about 2 parts to about 15 parts of at least one monomer B.

A crosslinking agent is used to build the molecular weight and the strength of the (meth)acrylate copolymer. Generally, the crosslinking agent is one that is copolymerized with monomers A and B. Suitable crosslinking agents are disclosed in U.S. Pat. No. 4,737,559 (Kellen), U.S. Pat. No. 5,506,279 (Babu et al.), and U.S. Pat. No. 6,083,856 (Joseph et al.). The crosslinking agent can be a photocrosslinking agent, which, upon exposure to ultraviolet radiation (e.g., radiation having a wavelength of about 250 nanometers to about 400 nanometers), causes the copolymer to crosslink.

The crosslinking agent is used in an effective amount, by which is meant an amount that is sufficient to cause crosslinking of the pressure sensitive adhesive to provide adequate cohesive strength to produce the desired final adhesion properties to the substrate of interest. Generally, the crosslinking agent is used in an amount of about 0.1 part to about 10 parts, based on the total amount of monomers.

One class of useful crosslinking agents include multifunctional (meth)acrylate species. Multifunctional (meth)acrylates include tri(meth)acrylates and di(meth)acrylates (that is, compounds comprising three or two (meth)acrylate groups). Typically di(meth)acrylate crosslinkers (that is, compounds comprising two (meth)acrylate groups) are used. Useful tri(meth)acrylates include, for example, trimethylolpropane tri(meth)acrylate, propoxylated trimethylolpropane triacrylates, ethoxylated trimethylolpropane triacrylates, tris (2-hydroxy ethyl)isocyanurate triacrylate, and pentaerythritol triacrylate. Useful di(meth)acrylates include, for example, ethylene glycol di(meth)acrylate, diethylene glycol di(meth)acrylate, triethylene glycol di(meth)acrylate, tetraethylene glycol di(meth)acrylate, 1,4-butanediol di(meth)acrylate, 1,6-hexanediol di(meth)acrylate, alkoxylated 1,6-hexanediol diacrylates, tripropylene glycol diacrylate, dipropylene glycol diacrylate, cyclohexane dimethanol di(meth)acrylate, alkoxylated cyclohexane dimethanol diacrylates, ethoxylated bisphenol A di(meth)acrylates, neopentyl glycol diacrylate, polyethylene glycol di(meth)acrylates, polypropylene glycol di(meth)acrylates, and urethane di(meth)acrylates.

Another useful class of crosslinking agents contain functionality which is reactive with carboxylic acid groups on the acrylic copolymer when a carboxylic acid group is present. Examples of such crosslinkers include multifunctional aziridine, isocyanate, epoxy, and carbodiimide compounds. Examples of aziridine-type crosslinkers include, for example 1,4-bis(ethyleneiminocarbonylamino)benzene, 4,4'-bis(ethyleneiminocarbonylamino)diphenylmethane, 1,8-bis(ethyleneiminocarbonylamino)octane, and 1,1'-(1,3-phenylene dicarbonyl)-bis-(2-methylaziridine). The aziridine crosslinker 1,1'-(1,3-phenylene dicarbonyl)-bis-(2-methylaziridine) (CAS No. 7652-64-4), commonly referred to as "Bisamide" is particularly useful. Common polyfunctional isocyanate crosslinkers include, for example, trimethylolpropane toluene diisocyanate, tolylene diisocyanate, and hexamethylene diisocyanate.

In other embodiments, when the first crosslinked pressure sensitive adhesive layer is a single polymeric material it is a rubber-based polymer material. Rubber-based pressure sensitive adhesives are generally of 2 classes, natural rubber-based or synthetic rubber-based.

Useful natural rubber pressure sensitive adhesives generally contain masticated natural rubber, from 25 parts to 300 parts of one or more tackifying resins to 100 parts of natural rubber, and typically from 0.5 to 2.0 parts of one or more antioxidants. Natural rubber may range in grade from a light pale crepe grade to a darker ribbed smoked sheet and includes such examples as CV-60, a controlled viscosity rubber grade and SMR-5, a ribbed smoked sheet rubber grade. Tackifying resins used with natural rubbers generally include but are not limited to wood rosin and its hydrogenated derivatives; terpene resins of various softening points, and petroleum-based resins, such as, the ESCOREZ 1300 series of C5 aliphatic olefin-derived resins from Exxon. Antioxidants are used to retard the oxidative attack on natural rubber, which can result in loss of the cohesive strength of the natural rubber adhesive. Useful antioxidants include but are not limited to amines, such as N-N' di-beta-naphthyl-1,4-phenylenediamine, available as AgeRite D; phenolics, such as 2,5-di-(t-amyl) hydroquinone, available as Santovar A, available from Monsanto Chemical Co., tetrakis[methylene 3-(3',5'-di-tert-butyl-4'-hydroxyphenyl) propianate]methane, available as IRGANOX 1010 from Ciba-Geigy Corp., and 2,2'-methylenebis(4-methyl-6-tert butyl phenol), available as Antioxidant 2246; and dithiocarbamates, such as zinc dithiodibutyl carbamate. Curing agents are used to partially vulcanize (crosslink) the pressure sensitive adhesive.

Another useful class of pressure sensitive adhesives are those comprising synthetic rubber. Such adhesives are generally rubbery elastomers, which are either self-tacky or non-tacky and require tackifiers.

Self-tacky synthetic rubber pressure sensitive adhesives include, for example, butyl rubber, a copolymer of isobutylene with less than 3 percent isoprene, polyisobutylene, a homopolymer of isoprene, polybutadiene, or styrene/butadiene rubber. Butyl rubber pressure sensitive adhesives often contain an antioxidant such as zinc dibutyl dithiocarbamate. Polyisobutylene pressure sensitive adhesives do not usually contain antioxidants. Synthetic rubber pressure sensitive adhesives, which generally require tackifiers, are also generally easier to melt process. They comprise polybutadiene or styrene/butadiene rubber, from 10 parts to 200 parts of a tackifier, and generally from 0.5 to 2.0 parts per 100 parts rubber of an antioxidant such as IRGANOX 1010. An example of a synthetic rubber is AMERIPOL 101 1A, a styrene/butadiene rubber available from BF Goodrich. Tackifiers that are useful include derivatives of rosins such as FORAL 85, a stabilized rosin ester from Hercules, Inc., the SNOWTACK series of gum rosins from Tenneco, and the AQUATAC series of tall oil rosins from Sylvachem; and synthetic hydrocarbon resins such as the PICCOLYTE A series, polyterpenes from Hercules, Inc., the ESCOREZ 1300 series of C5 aliphatic olefin-derived resins and the ESCOREZ 2000 Series of C9 aromatic/aliphatic olefin-derived resins. Curing agents are added to vulcanize (crosslink) the adhesive partially.

Examples of crosslinked first pressure sensitive adhesive layers that are blends of polymeric materials are those that include ionic crosslinks and may also have covalent crosslinks. Particularly suitable are adhesive compositions comprising at least one copolymer prepared from a mixture of at least one alkyl (meth)acrylate monomer, and at least one free radically polymerizable monomer comprising acid or base functionality, a high Tg polymer with a glass transition temperature of greater than 20° C. and a number average molecular weight of greater than about 100,000 Daltons, where the high Tg polymer is a (meth)acrylate copolymer comprising at least one free radically polymerizable monomer comprising acid or base functionality, and a crosslinker, where the functionality of the pressure sensitive adhesive component and the high Tg polymer from an acid-base interaction when mixed. Such adhesive compositions are described in U.S. Pat. No. 7,927,703 (Xia et al.).

The adhesive compositions of Xia et al. are compatibilized compositions that comprise: a majority of a pressure sensitive adhesive component, a high Tg polymer, and a crosslinker. As used herein the term "compatibilized" means that materials making up the adhesive composition form a stable multiphase morphology wherein the phases do not significantly coalesce and/or increase in size upon aging at temperatures at or above the glass transition temperature (Tg) of the materials. As used herein, high Tg polymer means a polymer with a glass transition temperature higher than polymers used to form a pressure sensitive adhesive, e.g., temperatures typically exceeding 20° C.

The PSA component and the high Tg polymer are compatibilized using a compatibilization scheme. As used herein the term "compatibilization scheme" refers to the method by which the PSA component and the high Tg polymer are made to be compatible with one another due to a modification of their interfacial interactions. The compatibilization scheme comprises functionalizing at least one polymer in the PSA and the high Tg polymer in such a way that an acid-base interaction is present between the two materials. The acid-base interaction that is present between the polymers described herein may be described as a Lewis acid-base type interaction. Lewis acid-base interactions require that one chemical component be an electron acceptor (acid) and the other an electron donor (base). The electron donor provides an unshared pair of electrons and the electron acceptor furnishes an orbital system that can accommodate the additional unshared pair of electrons. The following general equation describes the Lewis acid-base interaction:

A (acid)+:B (base)→A:B (acid-base complex).

The acid-base interactions between the polymer in the PSA and the high Tg polymer reduce their interfacial tension leading to a reduction in the dispersed phase particle size, and a stabilization of the multiphase morphology. The interfacial tension between the materials reduces the domain size of the high Tg polymer. In some embodiments, particularly those in optical applications, the domain size of the high Tg polymer dispersed within the pressure sensitive adhesive is less than the wavelength of light to produce optical clarity. In some embodiments the domain size of the high Tg polymer is less than 100 nanometers. In other embodiments, the domain size of the high Tg polymer is less than 50 nanometers.

The compatibilized scheme is independent of the particular functionality on the respective polymer. That is, either the PSA component or the high Tg polymer can contain the acid or the base functionality. For example, an acid functionalized polymer in the PSA component can be paired with a base functionalized high Tg polymer. Alternatively, a base functionalized polymer of the PSA component can be paired with an acid functionalized high Tg polymer.

As used in the present invention, an "acidic copolymer" is a polymer that is derived from at least one acidic monomer and at least one non-acidic copolymerizable monomer (i.e., a monomer that cannot be titrated with a base). In one embodiment, at least one copolymerizable monomer is a (meth)acrylate monomer such as an alkyl (meth)acrylate monomer. The acidic copolymer may optionally be derived from other copolymerizable monomers, such as vinyl monomers and basic monomers, as long as the resultant copolymer can still be titrated with a base. Thus, usually more acidic monomers are utilized to prepare the acidic copolymers than basic monomers.

A "basic copolymer" is a polymer that is derived from at least one basic monomer and at least one nonbasic copolymerizable monomer (i.e., a monomer that cannot be titrated with an acid). Other monomers can be copolymerized with the basic monomers (e.g., acidic monomers, vinyl monomers, and (meth)acrylate monomers), as long as the basic copolymer retains its basicity (i.e., it can still be titrated with an acid). In one embodiment, at least one copolymerizable monomer is a (meth)acrylate monomer such as an alkyl (meth)acrylate monomer.

The pressure sensitive adhesive component of the adhesive blend compositions comprise either an acidic or basic copolymer. When the PSA component comprises an acidic copolymer, the ratio of acidic monomers to non-acidic copolymerizable monomers utilized varies depending on desired properties of the resulting adhesive.

To achieve pressure sensitive adhesive characteristics, the corresponding copolymer typically has a resultant glass transition temperature (Tg) of less than about 0° C. Particularly suitable pressure sensitive adhesive copolymers are (meth)acrylate copolymers. Such copolymers typically are derived from monomers comprising about 40% by weight to about 98% by weight, often at least 70% by weight, more typically at least 85% by weight, or even about 90% by weight, of at least one alkyl (meth)acrylate monomer that, as a homopolymer, has a Tg of less than about 0° C.

Examples of such alkyl (meth)acrylate monomers are those in which the alkyl groups comprise from about 4 carbon atoms to about 12 carbon atoms and include, but are not limited to, n-butyl acrylate, 2-ethylhexyl acrylate, isooctyl acrylate, isononyl acrylate, isodecyl. acrylate, and mixtures thereof. Optionally, other vinyl monomers and alkyl (meth)acrylate monomers which, as homopolymers, have a Tg greater than 0° C., such as methyl acrylate, methyl methacrylate, isobornyl acrylate, vinyl acetate, styrene, and the like, may be utilized in conjunction with one or more of the low Tg alkyl (meth)acrylate monomers and copolymerizable basic or acidic monomers, provided that the Tg of the resultant (meth)acrylate copolymer is less than about 0° C.

In some embodiments, the PSA component is a basic (meth)acrylate copolymer. Typically the basic copolymer is derived from basic monomers comprising about 2% by weight to about 50% by weight, or from 5% by weight to about 30% by weight, of a copolymerizable basic monomer.

The adhesive blend composition also comprises a high Tg polymer additive comprising either an acidic or basic copolymer, depending on the functionality chosen for the pressure sensitive adhesive component. For example, if the pressure sensitive adhesive component comprises an acidic copolymer, then the high Tg polymer additive will be a basic copolymer to form a compatibilized blend.

To achieve the high Tg characteristics of the polymer additive, the corresponding copolymer is tailored to have a resultant glass transition temperature (Tg) of greater than about 20° C. In some embodiments, the Tg of the high Tg polymer additive is greater than 40° C., 50° C., or 60° C. In exemplary embodiments, the copolymers are (meth)acrylate copolymers. Such copolymers typically are derived from monomers comprising about 40% by weight to about 98% by weight, preferably at least 70% by weight, more preferably at least 85% by weight, most preferably about 90% by weight, of at least one alkyl (meth)acrylate monomer that, as a homopolymer, has a Tg of greater that about 20° C. Examples include vinyl monomers and alkyl (meth)acrylate monomers which, as homopolymers, have a Tg greater than 20° C., such as n-butyl methacrylate, methyl methacrylate, isobornyl acrylate, vinyl acetate, styrene, and the like.

Alkyl (meth)acrylate monomers with a Tg less than 0° C., such as monomers with alkyl groups comprising from about 4 carbon atoms to about 12 carbon atoms, including n-butyl acrylate, 2-ethylhexyl acrylate, isooctyl acrylate, isononyl acrylate, isodecyl acrylate, and mixtures thereof, may be utilized in conjunction with one or more of the high Tg alkyl (meth)acrylate monomers and copolymerizable basic or acidic monomers, provided that the Tg of the resultant (meth)acrylate copolymer is greater than about 20° C.

When the high Tg polymer additive is a basic copolymer, it is typically a basic (meth)acrylate copolymer. Basic (meth)acrylate copolymers typically are derived from basic monomers comprising about 2% by weight to about 50% by weight, preferably about 5% by weight to about 30% by weight, of a copolymerizable basic monomer.

When the high Tg polymer additive is an acidic copolymer, it is typically an acidic (meth)acrylate copolymer. Acidic (meth)acrylate copolymers typically are derived from acidic monomers comprising about 2% by weight to about 30% by weight, preferably about 2% by weight to about 15% by weight, of a copolymerizable acidic monomer.

In some embodiments, the copolymer of the high Tg polymer additive typically has an weight average molecular weight greater than 100,000. Higher molecular weight high Tg polymer is desirable because it enhances the thermal stability of the compatibilized blend, especially at elevated temperatures and extreme conditions. To utilize a high molecular weight high Tg polymer additive, other attributes of the high Tg polymer additive (such as monomer selection) and of the compatiblized blend (such as acid-base interaction level) are varied to retain compatability.

Typically the high Tg polymer additive is prepared from at least one high Tg monomer. High Tg monomers are generally those monoethylenically unsaturated monomers which as homopolymers have a glass transition temperature (Tg) greater than about 20° C. Typically, the high Tg polymer is derived from monoethylenically unsaturated monomers, which as homopolymers have a Tg of greater than 20° C. Typically the high Tg polymer is independently derived from monoethylenically unsaturated monomers selected from the group consisting of (meth)acrylate esters of non-tertiary alkyl alcohols, the alkyl groups of which comprise from about 1 to about 20, preferably about 1 to about 18 carbon atoms; acidic or basic monomers as defined above; vinyl-terminated monomers; and combinations thereof.

In most embodiments, the high Tg polymers are independently derived from (meth)acrylate monomers, although, for certain formulations, vinyl-terminated monomers, such as styrene, may show comparable or superior results. Examples of suitable monomers include, but are not limited to, t-butyl acrylate, methyl methacrylate, ethyl methacrylate, isopropyl methacrylate, n-butyl methacrylate, isobutyl methacrylate, s-butyl methacrylate, t-butyl methacrylate, stearyl methacrylate, phenyl methacrylate, cyclohexyl methacrylate, isobornyl acrylate, isobornyl methacrylate, benzyl methacrylate, bromoethyl methacrylate, 2-hydroxyethyl methacrylate, hydroxypropyl methacrylate, glycidyl methacrylate, ally methacrylate, styrene, vinyl acetate, vinyl chloride.

As will be described in greater detail below, a variety of different methods can be used to form the crosslinked pressure sensitive adhesive layer. A mixture of monomers and/or oligomers and crosslinking agent can be coated on a substrate such as a release liner and cured to form a crosslinked adhesive layer, or a fluid layer containing a mixture of monomers and crosslinking agent can be simultaneously coated along with a fluid layer containing the siloxane-based pressure sensitive adhesive layer, followed by drying and curing.

The dual-sided multi-layer adhesive also comprises a second siloxane-based pressure sensitive adhesive layer. In some embodiments, the second pressure sensitive adhesive comprises a siloxane pressure sensitive adhesive. Suitable siloxane pressure sensitive adhesives include, for example, those described in U.S. Pat. Nos. 5,527,578 and 5,858,545; and PCT Publication No. WO 00/02966. Specific examples include polydiorganosiloxane polyurea copolymers and blends thereof, such as those described in U.S. Pat. No. 6,007,914, and polysiloxane-polyalkylene block copolymers. Other examples of siloxane pressure sensitive adhesives include those formed from silanols, silicone hydrides, siloxanes, epoxides, and (meth)acrylates. When the siloxane pressure sensitive adhesive is prepared from (meth)acrylate-functional siloxanes, the adhesive is sometimes referred to as a siloxane (meth)acrylate.

The siloxane-based adhesive compositions comprise at least one siloxane elastomeric polymer and may contain other components such as tackifying resins. The elastomeric polymers include for example, urea-based siloxane copolymers, oxamide-based siloxane copolymers, amide-based siloxane copolymers, urethane-based siloxane copolymers, and mixtures thereof.

One example of a useful class of siloxane elastomeric polymers is urea-based silicone polymers such as silicone polyurea block copolymers. Silicone polyurea block copolymers include the reaction product of a polydiorganosiloxane diamine (also referred to as a silicone diamine), a diisocyanate, and optionally an organic polyamine. Suitable silicone polyurea block copolymers are represented by the repeating unit:

wherein each R is a moiety that, independently, is an alkyl moiety, having about 1 to 12 carbon atoms, and may be substituted with, for example, trifluoroalkyl or vinyl groups, a vinyl radical or higher alkenyl radical represented by the formula —$R^d$($CH_2$)$_a$CH=$CH_2$ wherein the $R^d$ group is —($CH_2$)$_b$— or —($CH_2$)$_c$CH=CH— and a is 1,2 or 3; b is 0, 3 or 6; and c is 3, 4 or 5, a cycloalkyl moiety having from about 6 to 12 carbon atoms and may be substituted with alkyl, fluoroalkyl, and vinyl groups, or an aryl moiety having from about 6 to 20 carbon atoms and may be substituted with, for example, alkyl, cycloalkyl, fluoroalkyl and vinyl groups or R is a perfluoroalkyl group as described in U.S. Pat. No. 5,028,679, or a fluorine-containing group, as described in U.S. Pat. No. 5,236,997, or a perfluoroether-containing group, as described in U.S. Pat. Nos. 4,900,474 and 5,118,775; typically, at least 50% of the R moieties are methyl radicals with the balance being monovalent alkyl or substituted alkyl radicals having from 1 to 12 carbon atoms, alkenyl radicals, phenyl radicals, or substituted phenyl radicals;

each Z is a polyvalent radical that is an arylene radical or an aralkylene radical having from about 6 to 20 carbon atoms, an alkylene or cycloalkylene radical having from about 6 to 20 carbon atoms, in some embodiments Z is 2,6-tolylene, 4,4'-methylenediphenylene, 3,3'-dimethoxy-4,4'-biphenylene, tetramethyl-m-xylylene, 4,4'-methylenedicyclohexylene, 3,5,5-trimethyl-3-methylenecyclohexylene, 1,6-hexamethylene, 1,4-cyclohexylene, 2,2,4-trimethylhexylene and mixtures thereof;

each Y is a polyvalent radical that independently is an alkylene radical of 1 to 10 carbon atoms, an aralkylene radical or an arylene radical having 6 to 20 carbon atoms;

each D is selected from the group consisting of hydrogen, an alkyl radical of 1 to 10 carbon atoms, phenyl, and a radical that completes a ring structure including B or Y to form a heterocycle;

where B is a polyvalent radical selected from the group consisting of alkylene, aralkylene, cycloalkylene, phenylene, heteroalkylene, including for example, polyethylene oxide, polypropylene oxide, polytetramethylene oxide, and copolymers and mixtures thereof;

m is a number that is 0 to about 1000;

n is a number that is at least 1; and p is a number that is at least 10, in some embodiments 15 to about 2000, or even 30 to 1500.

Useful silicone polyurea block copolymers are disclosed in, e.g., U.S. Pat. Nos. 5,512,650, 5,214,119, 5,461,134, and 7,153,924 and PCT Publication Nos. WO 96/35458, WO 98/17726, WO 96/34028, WO 96/34030 and WO 97/40103.

Another useful class of silicone elastomeric polymers are oxamide-based polymers such as polydiorganosiloxane polyoxamide block copolymers. Examples of polydiorganosiloxane polyoxamide block copolymers are presented, for example, in US Patent Publication No. 2007-0148475. The polydiorganosiloxane polyoxamide block copolymer contains at least two repeat units of Formula II.

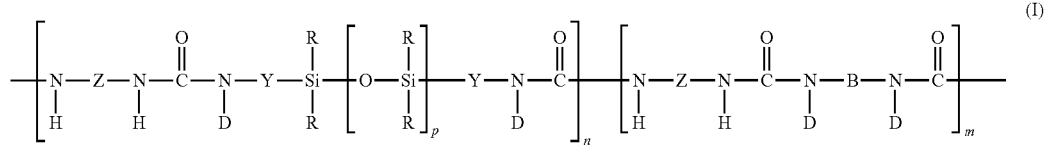

(I)

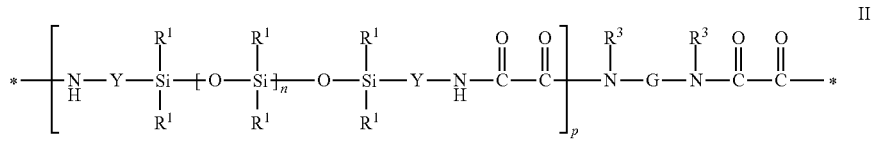

In this formula, each $R^1$ is independently an alkyl, haloalkyl, aralkyl, alkenyl, aryl, or aryl substituted with an alkyl, alkoxy, or halo, wherein at least 50 percent of the $R^1$ groups are methyl. Each Y is independently an alkylene, aralkylene, or a combination thereof. Subscript n is independently an integer of 40 to 1500 and the subscript p is an integer of 1 to 10. Group G is a divalent group that is the residue unit that is equal to a diamine of formula $R^3HN$-G-$NHR^3$ minus the two —$NHR^3$ groups. Group $R^3$ is hydrogen or alkyl (e.g., an alkyl having 1 to 10, 1 to 6, or 1 to 4 carbon atoms) or $R^3$ taken together with G and with the nitrogen to which they are both attached forms a heterocyclic group (e.g., $R^3HN$-G-$NHR^3$ is piperazine or the like). Each asterisk (*) indicates a site of attachment of the repeat unit to another group in the copolymer such as, for example, another repeat unit of Formula II.

Suitable alkyl groups for $R^1$ in Formula II typically have 1 to 10, 1 to 6, or 1 to 4 carbon atoms. Exemplary alkyl groups include, but are not limited to, methyl, ethyl, isopropyl, n-propyl, n-butyl, and iso-butyl. Suitable haloalkyl groups for $R^1$ often have only a portion of the hydrogen atoms of the corresponding alkyl group replaced with a halogen. Exemplary haloalkyl groups include chloroalkyl and fluoroalkyl groups with 1 to 3 halo atoms and 3 to 10 carbon atoms. Suitable alkenyl groups for $R^1$ often have 2 to 10 carbon atoms. Exemplary alkenyl groups often have 2 to 8, 2 to 6, or 2 to 4 carbon atoms such as ethenyl, n-propenyl, and n-butenyl. Suitable aryl groups for $R^1$ often have 6 to 12 carbon atoms. Phenyl is an exemplary aryl group. The aryl group can be unsubstituted or substituted with an alkyl (e.g., an alkyl having 1 to 10 carbon atoms, 1 to 6 carbon atoms, or 1 to 4 carbon atoms), an alkoxy (e.g., an alkoxy having 1 to 10 carbon atoms, 1 to 6 carbon atoms, or 1 to 4 carbon atoms), or halo (e.g., chloro, bromo, or fluoro). Suitable aralkyl groups for $R^1$ usually have an alkylene group having 1 to 10 carbon atoms and an aryl group having 6 to 12 carbon atoms. In some exemplary aralkyl groups, the aryl group is phenyl and the alkylene group has 1 to 10 carbon atoms, 1 to 6 carbon atoms, or 1 to 4 carbon atoms (i.e., the structure of the aralkyl is alkylene-phenyl where an alkylene is bonded to a phenyl group).

At least 50 percent of the $R^1$ groups are methyl. For example, at least 60 percent, at least 70 percent, at least 80 percent, at least 90 percent, at least 95 percent, at least 98 percent, or at least 99 percent of the $R^1$ groups can be methyl. The remaining $R^1$ groups can be selected from an alkyl having at least two carbon atoms, haloalkyl, aralkyl, alkenyl, aryl, or aryl substituted with an alkyl, alkoxy, or halo.

Each Y in Formula II is independently an alkylene, aralkylene, or a combination thereof. Suitable alkylene groups typically have up to 10 carbon atoms, up to 8 carbon atoms, up to 6 carbon atoms, or up to 4 carbon atoms. Exemplary alkylene groups include methylene, ethylene, propylene, butylene, and the like. Suitable aralkylene groups usually have an arylene group having 6 to 12 carbon atoms bonded to an alkylene group having 1 to 10 carbon atoms. In some exemplary aralkylene groups, the arylene portion is phenylene. That is, the divalent aralkylene group is phenylene-alkylene where the phenylene is bonded to an alkylene having 1 to 10, 1 to 8, 1 to 6, or 1 to 4 carbon atoms. As used herein with reference to group Y, "a combination thereof" refers to a combination of two or more groups selected from an alkylene and aralkylene group. A combination can be, for example, a single aralkylene bonded to a single alkylene (e.g., alkylene-arylene-alkylene). In one exemplary alkylene-arylene-alkylene combination, the arylene is phenylene and each alkylene has 1 to 10, 1 to 6, or 1 to 4 carbon atoms.

Each subscript n in Formula II is independently an integer of 40 to 1500. For example, subscript n can be an integer up to 1000, up to 500, up to 400, up to 300, up to 200, up to 100, up to 80, or up to 60. The value of n is often at least 40, at least 45, at least 50, or at least 55. For example, subscript n can be in the range of 40 to 1000, 40 to 500, 50 to 500, 50 to 400, 50 to 300, 50 to 200, 50 to100, 50 to 80, or 50 to 60.

The subscript p is an integer of 1 to 10. For example, the value of p is often an integer up to 9, up to 8, up to 7, up to 6, up to 5, up to 4, up to 3, or up to 2. The value of p can be in the range of 1 to 8, 1 to 6, or 1 to 4.

Group G in Formula II is a residual unit that is equal to a diamine compound of formula $R^3HN$-G-$NHR^3$ minus the two amino groups (i.e., —$NHR^3$ groups). Group $R^3$ is hydrogen or alkyl (e.g., an alkyl having 1 to 10, 1 to 6, or 1 to 4 carbon atoms) or $R^3$ taken together with G and with the nitrogen to which they are both attached forms a heterocyclic group (e.g., $R^3HN$-G-$NHR^3$ is piperazine). The diamine can have primary or secondary amino groups. In most embodiments, $R^3$ is hydrogen or an alkyl. In many embodiments, both of the amino groups of the diamine are primary amino groups (i.e., both $R^3$ groups are hydrogen) and the diamine is of formula $H_2N$-G-$NH_2$.

In some embodiments, G is an alkylene, heteroalkylene, polydiorganosiloxane, arylene, aralkylene, or a combination thereof. Suitable alkylenes often have 2 to 10, 2 to 6, or 2 to 4 carbon atoms. Exemplary alkylene groups include ethylene, propylene, butylene, and the like. Suitable heteroalkylenes are often polyoxyalkylenes such as polyoxyethylene having at least 2 ethylene units, polyoxypropylene having at least 2 propylene units, or copolymers thereof. Suitable polydiorganosiloxanes include the polydiorganosiloxane diamines of Formula II, which are described above, minus the two amino groups. Exemplary polydiorganosiloxanes include, but are not limited to, polydimethylsiloxanes with alkylene Y groups. Suitable aralkylene groups usually contain an arylene group having 6 to 12 carbon atoms bonded to an alkylene group having 1 to 10 carbon atoms. Some exemplary aralkylene groups are phenylene-alkylene where the phenylene is bonded to an alkylene having 1 to 10 carbon atoms, 1 to 8 carbon atoms, 1 to 6 carbon atoms, or 1 to 4 carbon atoms. As used herein with reference to group G, "a combination thereof" refers to a combination of two or more groups selected from an alkylene, heteroalkylene, polydiorganosiloxane, arylene, and aralkylene. A combination can be, for example, an aralkylene bonded to an alkylene (e.g., alkylene-arylene-alkylene). In one exemplary alkylenearylene-alkylene combination, the arylene is phenylene and each alkylene has 1 to 10, 1 to 6, or 1 to 4 carbon atoms.

The polydiorganosiloxane polyoxamide tends to be free of groups having a formula —$R^a$—(CO)—NH— where $R^a$ is an alkylene. All of the carbonylamino groups along the backbone of the copolymeric material are part of an oxalylamino group (i.e., the —(CO)—(CO)—NH— group). That is, any carbonyl group along the backbone of the copolymeric material is bonded to another carbonyl group and is part of an oxalyl group. More specifically, the polydiorganosiloxane polyoxamide has a plurality of aminoxalylamino groups.

The polydiorganosiloxane polyoxamide is a linear, block copolymer and is an elastomeric material. Unlike many of the known polydiorganosiloxane polyamides that are generally formulated as brittle solids or hard plastics, the polydiorganosiloxane polyoxamides can be formulated to include greater than 50 weight percent polydiorganosiloxane segments based on the weight of the copolymer. The weight percent of the diorganosiloxane in the polydiorganosiloxane polyoxamides can be increased by using higher molecular weight polydiorganosiloxanes segments to provide greater than 60 weight percent, greater than 70 weight percent, greater than 80 weight percent, greater than 90 weight percent, greater than 95 weight percent, or greater than 98 weight percent of the polydiorganosiloxane segments in the polydiorganosiloxane polyoxamides. Higher amounts of the polydiorganosiloxane can be used to prepare elastomeric materials with lower modulus while maintaining reasonable strength.

Some of the polydiorganosiloxane polyoxamides can be heated to a temperature up to 200° C., up to 225° C., up to 250° C., up to 275° C., or up to 300° C. without noticeable degradation of the material. For example, when heated in a thermogravimetric analyzer in the presence of air, the copolymers often have less than a 10 percent weight loss when scanned at a rate 50° C. per minute in the range of 20° C. to about 350° C. Additionally, the copolymers can often be heated at a temperature such as 250° C. for 1 hour in air without apparent degradation as determined by no detectable loss of mechanical strength upon cooling.

The polydiorganosiloxane polyoxamide copolymers have many of the desirable features of polysiloxanes such as low glass transition temperatures, thermal and oxidative stability, resistance to ultraviolet radiation, low surface energy and hydrophobicity, and high permeability to many gases. Additionally, the copolymers exhibit good to excellent mechanical strength.

Another useful class of silicone elastomeric polymers is amide-based silicone polymers. Such polymers are similar to the urea-based polymers, containing amide linkages (—N(D)-C(O)—) instead of urea linkages (—N(D)-C(O)—N(D)-), where C(O) represents a carbonyl group and D is a hydrogen or alkyl group.

Such polymers may be prepared in a variety of different ways. Starting from the polydiorganosiloxane diamine described above in Formula II, the amide-based polymer can be prepared by reaction with a poly-carboxylic acid or a poly-carboxylic acid derivative such as, for example diesters. In some embodiments, an amide-based silicone elastomer is prepared by the reaction of a polydiorganosiloxane diamine and di-methyl salicylate of adipic acid.

An alternative reaction pathway to amide-based silicone elastomers utilizes a silicone di-carboxylic acid derivative such as a carboxylic acid ester. Silicone carboxylic acid esters can be prepared through the hydrosilation reaction of a silicone hydride (i.e. a silicone terminated with a silicon-hydride (Si—H) bonds) and an ethylenically unsaturated ester. For example a silicone di-hydride can be reacted with an ethylenically unsaturated ester such as, for example, $CH_2$=CH—$(CH_2)_n$—C(O)—OR, where C(O) represents a carbonyl group and n is an integer up to 15, and R is an alkyl, aryl or substituted aryl group, to yield a silicone chain capped with —Si—$(CH_2)_{n+2}$—C(O)—OR. The —C(O)—OR group is a carboxylic acid derivative which can be reacted with a silicone diamine, a polyamine or a combination thereof. Suitable silicone diamines and polyamines have been discussed above and include aliphatic, aromatic or oligomeric diamines (such as ethylene diamine, phenylene diamine, xylylene diamine, polyoxalkylene diamines, etc).

Another useful class of silicone elastomeric polymers is urethane-based silicone polymers such as silicone polyurea-urethane block copolymers. Silicone polyurea-urethane block copolymers include the reaction product of a polydiorganosiloxane diamine (also referred to as silicone diamine), a diisocyanate, and an organic polyol. Such materials are structurally very similar to the structure of Formula I except that the —N(D)-B—N(D)-links are replaced by —O—B—O— links. Examples are such polymers are presented, for example, in U.S. Pat. No. 5,214,119.

These urethane-based silicone polymers are prepared in the same fashion as the urea-based silicone polymers except that an organic polyol is substituted for an organic polyamine. Typically, since the reaction between a alcohol group and an isocyanate group is slower than the reaction between a amine group and an isocyanate group, a catalyst such as a tin catalyst commonly used in polyurethane chemistry, is used.

Among the particularly suitable siloxane-based pressure sensitive adhesive layers are those that include polydiorganosiloxane polyoxamide copolymers prepared by the methods described in U.S. Pat. No. 8,765,881 (Hays et al.). This method includes providing an oxalylamino-containing compound and then reacting the oxalylamino-containing compound with a silicone-based amine. The oxalylamino-containing compound is of Formula III.

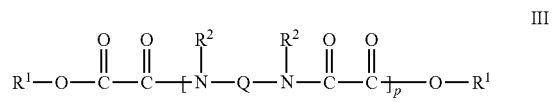

III

In this formula, each $R^1$ group is independently an alkyl, haloalkyl, aralkyl, substituted aralkyl, alkenyl, aryl, substituted aryl, or imino of formula —N=$CR^4R^5$.

Each $R^4$ is hydrogen, alkyl, aralkyl, substituted aralkyl, aryl, or substituted aryl. Each $R^5$ is an alkyl, aralkyl, substituted aralkyl, aryl, or substituted aryl. Each $R^2$ is independently hydrogen, alkyl, aralkyl, aryl, or part of a heterocyclic group that includes Q and the nitrogen to which $R^2$ is attached. Group Q is (a) an alkylene, (b) arylene, (c) a carbonylamino group linking a first group to a second group, wherein the first group and the second group are each independently an alkylene, arylene, or a combination thereof, (d) part of a heterocyclic group that includes $R^2$ and a nitrogen to which $R^2$ is attached, or (e) a combination thereof. The variable p is an integer equal to at least 1. The silicone-based amine that is reacted with the oxalylamino-containing compound has a polydiorganosiloxane segment and at least two primary amino groups, at least two secondary amino groups, or at least one primary amino group plus at least one secondary amino group. The resulting polydiorganosiloxane polyoxamide copolymers have the same general formula as Formula II above, where the G groups in Formula II correspond to Q groups in Formula III.

The dual-sided adhesive articles can have a wide range of thicknesses. Typically, the first crosslinked pressure sensitive adhesive layer has a first thickness and the second siloxane-based adhesive layer has a second thickness, where the first thickness is greater than the second thickness, and the total adhesive thickness of the article comprises the sum of the first thickness and the second thickness.

In some embodiments, the ratio of the first thickness to the second thickness is in the range of 2:1 to 10:1. In other words, the range of thicknesses runs the gamut from the first thickness being twice as thick as the second thickness, to the first thickness being ten times as thick as the second thickness.

A wide range of layer thicknesses are suitable. Typically, the thickness of the siloxane-based pressure sensitive adhesive layer (the second thickness) is in the range of 2.5 micrometers to 60 micrometers. The thickness of the first thickness (the crosslinked pressure sensitive adhesive layer) is thicker than the second thickness layer, the thickness determined by the range of thickness ratios give above.

The dual-sided adhesive articles also include a microstructured release liner, the microstructured surface of the release liner being in contact with the siloxane-based pressure sensitive adhesive layer. The microstructured release liner imparts a structured surface to the siloxane-based pressure sensitive adhesive liner. This structured surface features are temporary features, meaning that the structures are designed to eventually disappear. There are numerous advantages to using adhesive articles with temporarily structured surfaces. Sometimes these adhesive articles are described as "laminating adhesive articles", since upon lamination the structures at least partially disappear. One such advantage of temporarily structured surfaces is air egress from the bond line. When an adhesive bond is formed, the adhesive surface is contacted to an adherend surface. When this contact is made, air can become trapped between the adhesive layer and the adherend surface, causing bubbles or other defects to form in the bond line, the line along which the two surfaces are joined together. This is particularly true when dealing with adherends that are rigid and semi-rigid substrates, but is also true when dealing with flexible substrates. This is particularly true with articles that are hand-laminated, as the lamination is subject to variability based upon operator experience and skill. These defects not only affect the adhesion of the adhesive layer to the adherend surface, but also affect the aesthetic appearance of the bond line and in the case of optical articles can ruin the formed article. In optical articles in which light travels through the adhesive layer, the presence of air bubbles and similar defects can greatly affect the optical properties such as light transmission, clarity, and haze and can make the bond line unacceptable, and can impact the viewing experience. To prevent these defects, a structured adhesive surface is often used. Generally, these structures are microstructures. During lamination, the microstructural features flatten out, thereby wetting the adherend surface, and forming a bond to the adherend surface. In the course of lamination, air bleeds out through the microstructural features to minimize or prevent the formation of bonding defects. The air egress feature is particularly important when dealing with lamination to adherends that are rigid substrates, especially rigid-to-rigid lamination or where the object to be laminated is relatively large. Currently used methods to prevent defects in such laminations include techniques such as coating the adhesive layer with water or a water-detergent solution to prevent bubble formation during lamination. These techniques require removal of the water by evaporation. Bubble formation is particularly unacceptable in optical applications.

Two types of microstructured release liners are suitable for use in the articles of this disclosure. One type of release liner is that in which a structured pattern is present of the surface of the release liner when the release liner is contacted to the surface of the siloxane-based pressure sensitive adhesive layer. The second useful type of release liner is that which has flat or unstructured surface when the release liner is contacted to the surface of the siloxane-based pressure sensitive adhesive layer, and then the liner and the siloxane-based pressure sensitive adhesive layer together are embossed while in contact with each other. This process is described in greater detail below.

A wide range of release liners with a structured pattern present on its surface (frequently called microstructured release liners) are suitable. Typically the microstructured release liners are prepared by embossing. This means that the release liner has an embossable surface which is contacted to a structured tool with the application of pressure and/or heat to form an embossed surface. This embossed surface is a structured surface. The structure on the embossed surface is the inverse of the structure on the tool surface, that is to say a protrusion on the tool surface will form a depression on the embossed surface, and a depression on the tool surface will form a protrusion on the embossed surface.

In the second type of release liner, the surface that contacts the adhesive layer is not a structured surface, i.e. it is flat, and the structured surface is formed in the adhesive layer and the liner by embossing through the liner. Thus, rather than a structured liner being contacted to the adhesive layer, a flat liner is contacted to the adhesive layer and the liner/adhesive laminate is embossed with a structured tool to impart a structure to the liner and the adhesive layer. In this way the advantages of having the structures of a structured adhesive layer protected by a structured liner until use is achieved without having to pre-form a structured liner.

A wide variety of patterns and shapes can be present in the surface of the microstructured surface of the release liner. The shape or pattern of the structures does not matter if the pattern is pre-embossed into the release liner surface prior to contacting the adhesive layer or if the structure is imparted to the release liner surface by embossing through the release liner when the release liner is in contact with the adhesive layer. The structures may have a wide variety of shapes and sizes. In general the structures are microstructures, meaning that they are microstructural features with at least 2 dimensions of the structures of microscopic size. The microstructural features may assume a variety of shapes. Representative examples include hemispheres, prisms (such as square prisms, rectangular prisms, cylindrical prisms and other similar polygonal features), pyramids, ellipses, grooves (e.g., V-grooves), channels, and the like. In general, it is desirable to include topographical features that promote air egress at the bonding interface when the adhesive layer is laminated to an adherend. In this regard, V-grooves and channels that extend to the edge of the article are particularly useful. The particular dimensions and patterns characterizing the microstructural features are selected based upon the specific application for which the article is intended.

Typically the height of the microstructured features on the release liners above the base of the release liner surface is less than or equal to the thickness of the siloxane-based pressure sensitive adhesive layer. Generally, it is desirable for the microstructured features to not protrude into the crosslinked pressure sensitive adhesive layer of the dual-layer adhesive article.

The dual-sided adhesive article may also comprise additional optional elements. In some embodiments, the dual-sided adhesive article may further comprise a second release liner in contact with the first major surface of the first crosslinked pressure sensitive adhesive layer. This second release liner may be a flat release liner or it may be a microstructured release liner. If the second release liner is a microstructured release liner, it generally comprises at least one microstructured surface that comprises an array of microstructures, where the microstructured surface is in contact with the first major surface of the first crosslinked pressure sensitive adhesive layer. Thus when this second liner is removed it imparts a microstructured surface to the first crosslinked pressure sensitive adhesive layer. This microstructured surface has all of the advantages of a microstructured adhesive surfaces (such as air egress) and because the microstructures were imparted into a crosslinked pressure sensitive adhesive layer, once the liner is removed the structures are unstable due to the rebound effect described above.

A variety of methods can be used to prepare the dual-sided adhesive articles of this disclosure and used them to make adhesive laminates. Once the dual sided adhesive articles are formed, the articles comprising a first crosslinked pressure sensitive adhesive layer with a first major surface and a second major surface, and a second siloxane-based pressure sensitive adhesive layer with a first major surface and a second major surface. The first major surface of the second siloxane-based pressure sensitive adhesive layer is in contact with the second major surface of the first crosslinked pressure sensitive adhesive layer, and a release liner having at least one surface comprising a microstructured surface that comprises an array of microstructures, where the microstructured surface is in contact with the second major surface of the second siloxane-based pressure sensitive adhesive layer. The article may also optionally have a second release liner in contact with the first major surface of the first crosslinked pressure sensitive adhesive layer, the second release liner being either a flat (that is to say not structured), or a structured release liner. The microstructured release liner is removed from the second major surface of the second siloxane-based pressure sensitive adhesive layer, and the exposed second major surface of the second siloxane-based pressure sensitive adhesive layer, which comprises a microstructured surface, is contacted to a first substrate. If a second optional release liner is present on the first major surface of the first crosslinked pressure sensitive adhesive layer, it can be removed and the exposed crosslinked pressure sensitive adhesive layer can be contacted to a second substrate.

As mentioned above, the first crosslinked pressure sensitive adhesive layer and the second siloxane-based pressure sensitive adhesive layer have different surface energies, and thus are suitable for bonding different types of substrates. In many embodiments, the first and second pressure sensitive adhesive layers are optically transparent or optically clear pressure sensitive adhesives. Additionally, the microstructured surface of the second siloxane-based pressure sensitive adhesive layer is unstable when not in contact with the structured release liner, causing the microstructures to diminish rapidly and eventually disappear completely. If the second optional release is also a microstructured release liner, a similar rebound response occurs when the first crosslinked pressure sensitive adhesive layer is contacted to the second substrate, with the microstructures being unstable and diminishing rapidly and eventually disappearing completely. This is particularly desirable if the substrates are optical substrates and the laminate formed is an optical article. By the structures being unstable, it is meant that the adhesive structures spontaneously collapse and wet out a surface to which the adhesive layer is contacted without the need to apply pressure or heat. Typically, the collapse of the structures is slow enough to give the handler time to laminate the adhesive layer to an adherend, but quickly enough so that adhesive strength builds upon lamination without the need for applied pressure. Typically, complete collapse of the structures is observed within 30 days, more typically 10 days, or even less.

A wide range of substrates are suitable for use in preparing the laminates of this disclosure. The substrates may be rigid or non-rigid. Examples of suitable substrates include conventional tape backings such as films of polyester, polyolefin, and the like: rigid plates of glass or polymeric materials such as polymethylmethacrylate (PMMA) or polycarbonate (PC); webs such as non-woven webs, fabrics, or foams; a wide range of optical films; or the exterior surface of an article or device.

In some embodiments, the resulting articles can be optical elements or can be used to prepare optical elements. As used herein, the term "optical element" refers to an article that has an optical effect or optical application. The optical elements can be used, for example, in electronic displays, architectural applications, transportation applications, projection applications, photonics applications, and graphics applications. Suitable optical elements include, but are not limited to, screens or displays, cathode ray tubes, polarizers, reflectors, lighting elements, solar elements, windows, protective films, and the like.

Any suitable optical film can be used in the articles. As used herein, the term "optical film" refers to a film that can be used to produce an optical effect. The optical films are typically polymer-containing films that can be a single layer or multiple layers. The optical films are flexible and can be of any suitable thickness. The optical films often are at least partially transmissive, reflective, antireflective, polarizing, optically clear, or diffusive with respect to some wavelengths of the electromagnetic spectrum (e.g., wavelengths in the visible ultraviolet, or infrared regions of the electromagnetic spectrum). Exemplary optical films include, but are not limited to, visible mirror films, color mirror films, solar reflective films, infrared reflective films, ultraviolet reflective films, reflective polarizer films such as a brightness enhancement films and dual brightness enhancement films, absorptive polarizer films, optically clear films, tinted films, and antireflective films.

In some embodiments the optical film has a coating. In general, coatings are used to enhance the function of the film or provide additional functionality to the film. Examples of coatings include, for example, hardcoats, anti-fog coatings, anti-scratch coatings, privacy coatings or a combination thereof. Coatings such as hardcoats, anti-fog coatings, and anti-scratch coatings that provide enhanced durability, are desirable in applications such as, for example, touch screen sensors, display screens, graphics applications and the like. Examples of privacy coatings include, for example, blurry or hazy coatings to give obscured viewing or louvered films to limit the viewing angle.

Some optical films have multiple layers such as multiple layers of polymer-containing materials (e.g., polymers with or without dyes) or multiple layers of metal-containing material and polymeric materials. Some optical films have alternating layers of polymeric material with different indexes of refraction. Other optical films have alternating polymeric layers and metal-containing layers. Exemplary optical films are described in the following patents: U.S. Pat. No. 6,049,419 (Wheatley et al.); U.S. Pat. No. 5,223,465 (Wheatley et al.); U.S. Pat. No. 5,882,774 (Jonza et al.); U.S. Pat. No. 6,049,419 (Wheatley et al.); U.S. Pat. No. RE 34,605 (Schrenk et al.); U.S. Pat. No. 5,579,162 (Bjornard et al.), and U.S. Pat. No. 5,360,659 (Arends et al.).

As mentioned above, a variety of different methods can be used to form the dual-sided adhesive articles. In a first general methodology, the first and second adhesive layers are prepared in a sequential process, in the second general methodology, the first and second adhesive are prepared simultaneously. Each of these methodologies will be described below.

In the first methodology, a first crosslinked pressure sensitive adhesive layer comprising a first major surface and second major surface is formed. This first crosslinked pressure sensitive adhesive layer may be formed in a variety of ways, it may be a premade tape article with a substrate layer and a coating of the first crosslinked pressure sensitive adhesive layer. This substrate layer could be a tape backing or film layer or it could be a release liner, either a microstructured release liner or a flat (unstructured) release liner. To the second major surface of the first crosslinked pressure sensitive adhesive layer is coated a mixture comprising the second siloxane-based pressure sensitive adhesive and at least one solvent. The mixture comprising the second siloxane-based pressure sensitive adhesive and at least one solvent is dried to form the second siloxane-based pressure sensitive adhesive layer which has a first major surface and a second major surface where the first major surface is in contact with the second major surface of the first crosslinked pressure sensitive adhesive layer. A release liner is contacted to the second major surface of the second siloxane-based pressure sensitive adhesive layer. The release liner comprises either a microstructured release liner comprising at least one microstructured surface with an array of microstructures, where the microstructured surface is in contact with the second major surface of the second siloxane-based pressure sensitive adhesive layer, or a release liner comprising a first major surface and a second major surface where the first major surface is in contact with the second major surface of the second siloxane-based pressure sensitive adhesive layer and wherein both the first and the second major surfaces are flat.

When the release liner is a flat release liner, the release liner is embossed to form a microstructured pattern in the release liner and the second siloxane-based pressure sensitive adhesive layer. This embossing is carried out in a manner similar to that described in the pending applications with Ser. Nos. 61/831,761 and 61/831,766 filed Jun. 6, 2013. In this process, the second major surface of the release liner is contacted to a structured tool which impresses a microstructured pattern through the release liner and into at least the second siloxane-based pressure sensitive adhesive layer.

The structured tool is an implement for imparting a structure or finish to a surface and which may be continuously reused in the process. Typically, the structured tool is a molding tool. Structured molding tools can be in the form of a planar stamping press, a flexible or inflexible belt, or a roller. Furthermore, molding tools are generally considered to be tools from which the structured pattern is generated in the surface by embossing, coating, casting, or platen pressing and do not become part of the finished article. In many embodiments, the structured tool is a microstructured tool, meaning that the tool has a microstructured pattern on its surface.

A broad range of methods are known to those skilled in this art for generating microstructured molding tools. Examples of these methods include but are not limited to photolithography, etching, discharge machining, ion milling, micromachining, and electroforming. Microstructured molding tools can also be prepared by replicating various microstructured surfaces, including irregular shapes and patterns, with a moldable material such as those selected from the group consisting of crosslinkable liquid silicone rubber, radiation curable urethanes, etc. or replicating various microstructures by electroforming to generate a negative or positive replica intermediate or final embossing tool mold. Also, microstructured molds having random and irregular shapes and patterns can be generated by chemical etching, sandblasting, shot peening or sinking discrete structured particles in a moldable material. Additionally any of the microstructured molding tools can be altered or modified according to the procedure taught in U.S. Pat. No. 5,122,902 (Benson). The tools may be prepared from a wide range of materials including metals such as nickel, copper, steel, or metal alloys, or polymeric materials.

The multi-layer article (substrate/first crosslinked pressure sensitive adhesive layer/second siloxane-based pressure sensitive adhesive layer/release liner) is placed between the structured surface of the tool and a support surface to form a construction. In this construction, the support surface is in contact with the substrate, and the liner is in contact with the structured surface of the tool. In many embodiments, it may be desirable that the support surface be an essentially smooth surface that does not affect the surface of the substrate with which it is in contact. In some embodiments, however, it may be desirable that the support surface contain a pattern. This pattern can change the surface characteristics of the substrate surface, but unlike the embossing pattern on the structured surface of the tool, this pattern is designed to only alter the characteristics of the surface of the substrate and does not affect the other layers. For example, if the support surface contains a textured surface, it can impart a matte-type finish to the substrate surface.

Pressure is applied to the construction comprising the support surface, multi-layer construction, and structured tool, and is then released. The applied pressure causes at least some of the structures on the surface of the tool to distort the liner and the adhesive layer but does not distort the second major surface of the substrate. Also, the distortion in the liner is retained upon release of the applied pressure, such that a permanent change is made in the liner. In some embodiments, it may be desirable for a combination of heat and pressure to be applied.

The construction comprising the support surface, multi-layer construction, and structured tool may be together for a relatively long time or a relatively short time. For example, if a platen press is used to prepare the article the support surface may be the support bed of the press, and the structured tool may be the platen or a tool may be attached to the platen. In other embodiments, the support surface may be flat roller, and the tool may be a roller with a structured surface, and the multi-layer article may be passed between the rollers. Thus the process of simultaneously embossing a pattern onto the adhesive layer and the liner can be done in a batch wise process, a semi-continuous process or a continuous process. In a batch wise process, the multi-layer article is placed in an apparatus such as a platen press, the pressure is applied through the platen that is either a structured tool or has a structured tool attached to it, pressure is released and the embossed multi-layer article is removed. In a semi-continuous process, instead of a discrete multi-layer article, the multi-layer article is a continuous web. The web can then be drawn into the press, pressed, and drawn out of the press. Additionally, a series of presses could be used to press multiple regions of the web at a time. An example of a continuous process is the use of rollers. The multi-layer article can be fed between a pair of rollers, one smooth and the other comprising a structured surface. In this process, the pressure is supplied by passing a web of multi-layer article between the two rollers. A pair of such rollers is often referred to as a nip.

In the second general methodology, the two pressure sensitive adhesive layers are formed simultaneously using a multi-layer coating method. This coating method is described in US Patent Publication No. 2013-0316076. The method comprises providing a first coating fluid, providing a second coating fluid, the second coating fluid having a surface tension that is less than that of the first coating fluid, moving a release liner along a path through a coating station, flowing the first coating fluid at a rate sufficient to form a continuous flowing layer towards the substrate, flowing the second coating fluid onto the continuous flowing layer thereby forming a composite flowing layer, contacting the substrate with the composite flowing layer such that the second coating fluid is interposed between the continuous flowing layer and the substrate, forming the composite flowing layer into a film after the composite flowing layer contacts the substrate. The film formed from the composite flowing layer is a multi-layer film, that is to say that it is the dual-sided adhesive article.

In some embodiments, the first coating layer forms the crosslinked pressure sensitive adhesive layer, and the second coating layer forms the siloxane-based pressure sensitive adhesive layer. After the multi-layer film is formed from the composite flowing layer, the exposed surface of the release liner is contacted to a microstructuring tool and a microstructured pattern is pressed through the release liner and into at least the second coating layer, using the process described above.

Typically, in these embodiments, the first coating fluid comprises a crosslinkable pressure sensitive adhesive, and the second coating fluid comprises a siloxane-based pressure sensitive adhesive. Often, one or both of the first and second coating fluids comprises at least one solvent, and forming the composite flowing layer into a film comprises drying and or curing.

In other embodiments, the first coating layer forms the siloxane-based pressure sensitive adhesive layer, and the second coating layer forms the crosslinked pressure sensitive adhesive layer. After the multi-layer film is formed from the composite flowing layer, the exposed surface of the siloxane-based pressure sensitive adhesive layer is contacted to a release liner. The release liner may be a microstructured release liner or it may be a flat release liner. If a flat release liner is used, the exterior release liner is contacted to a microstructuring tool and a microstructured pattern is pressed through the release liner and into at least the second coating layer, using the process described above.

Figure 1B:
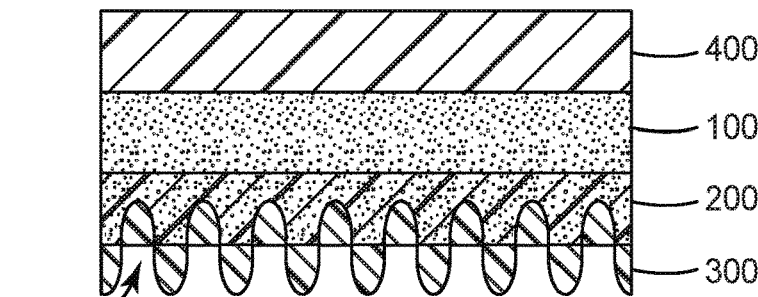
Figure 2:
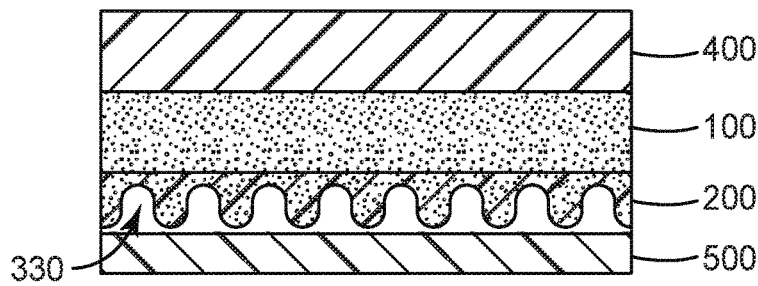
FIG. 2 shows a cross-sectional view of a laminate article of this disclosure.
Figure 3:
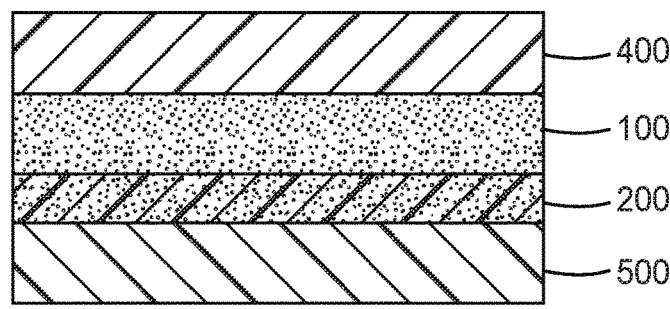
FIG. 3 shows a cross-sectional view of the laminate article of FIG. 2 at a later time.
Figure 4:
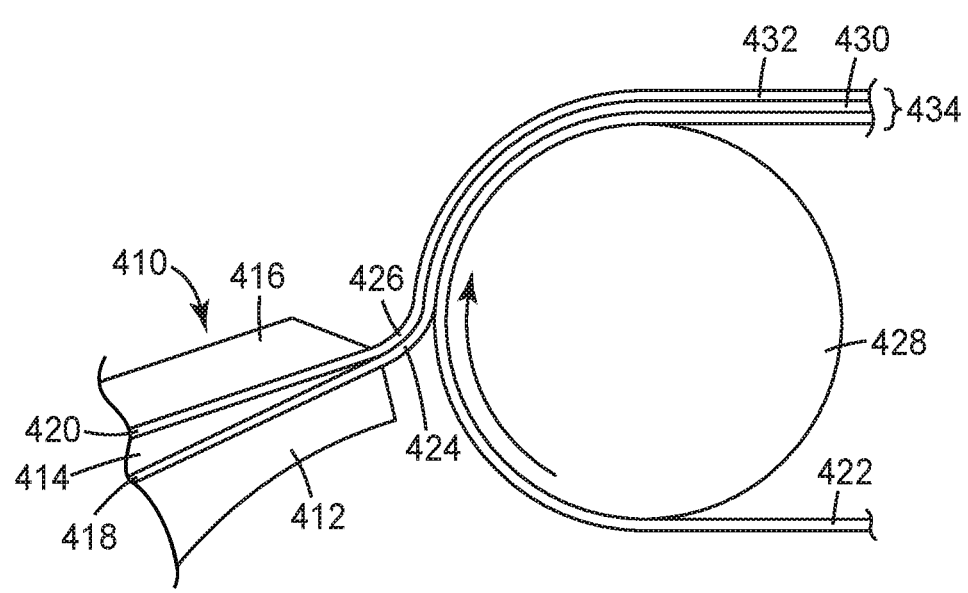
FIG. 4 shows a schematic of an exemplary multi-layer coating method of this disclosure.

Exemplary articles and methods of preparing and using the articles of this disclosure are illustrated in the figures. FIGS. 1A and 1B disclose exemplary articles of this disclosure prepared by the two methodologies described above. FIG. 2 shows an article prepared by removing the release liner and laminating to a substrate, and FIG. 3 illustrates the article of Figure after enough time has elapsed to permit the microstructures to disappear. FIG. 4 shows a multi-layer coating method useful for preparing articles of this disclosure.

FIG. 1A shows an article that has been prepared using the first methodology described above. In FIG. 1A, first cross-linked pressure sensitive adhesive layer 100 is in contact with second siloxane-based pressure sensitive adhesive layer 200. Microstructured liner 300 is in contact with second siloxane-based pressure sensitive adhesive layer 200, with microstructures 310 pressing into the surface of second siloxane-based pressure sensitive adhesive layer 200. Optional substrate layer 400, which can be a film or release liner (structured or unstructured) is also shown.

FIG. 1B shows an article that has been prepared using the second methodology described above. In FIG. 1B, first crosslinked pressure sensitive adhesive layer 100 is in contact with second siloxane-based pressure sensitive adhesive layer 200. Liner 300 is in contact with second siloxane-based pressure sensitive adhesive layer 200, and has been embossed through liner 300 and second siloxane-based pressure sensitive adhesive layer 200 with microstructures 320. Optional substrate layer 400, which can be a film or release liner (structured or unstructured) is also shown.

FIG. 2 shows an article of either FIG. 1A of 1B, where the Liner 300 has been removed and the second siloxane-based pressure sensitive adhesive layer 200 has been laminated to substrate 500. Air gaps 330 are the result of the microstructures 310 or 320 formed in the second siloxane-based pressure sensitive adhesive layer 200.

FIG. 3 shows the article of FIG. 2 after enough time has elapsed for the air gaps 330 to disappear from the bond line between second siloxane-based pressure sensitive adhesive layer 200 and substrate 500.

FIG. 4 shows a schematic of an exemplary multi-layer coating method that may be used in this disclosure. Multi-layer coating applicator 410 comprises upstream bar 412, wedge bar 414, and downstream bar 416, and which are juxtaposed to form cavities such as slots or channels within the applicator. First and second coating fluids, 418 and 420, respectively, are supplied by individual pumps (not shown) to the applicator for application to substrate 422. In some embodiments, substrate 422 is a release substrate such as release liner or a release film. The first coating fluid 418 forms continuous flowing layer 424. The second coating fluid flows from the applicator and forms continuous flowing layer 426 on the surface of continuous first flowing layer 424. The substrate is continuously moved through the coating station, in the direction shown by the arrow, on the peripheral surface of backup roller 428 by a conveyance means (not shown). The first and second coated layers, 430 and 432, respectively, on release substrate 422 comprise multi-layer coated article 434.

The multi-layer coating applicator shown in FIG. 4 is a type of extrusion applicator, particularly referred to as a slotted die applicator or coater with the fluids being fed in a pre-metered fashion through adjustable slots. Slotted die coaters typically have one slot for coating a fluid situated near and about parallel to a second slot for coating a second fluid with the orifices located near the moving substrate. The flow of each fluid through the respective slots can be controlled with shims. Use of this type of applicator is disclosed, for example, in U.S. Pat. Nos. 5,759,274; 5,639,305; 5,741,549; 6,720,025 B2; and 7,097,673 B2.

This disclosure includes the following embodiments:

Among the embodiments are dual-sided adhesive articles. A first embodiment includes a dual-sided adhesive article comprising: a first crosslinked pressure sensitive adhesive layer with a first major surface and a second major surface, and a first surface energy; a second siloxane-based pressure sensitive adhesive layer with a first major surface and a second major surface, a second surface energy, wherein the first major surface of the second siloxane-based pressure sensitive adhesive layer is in contact with the second major surface of the first crosslinked pressure sensitive adhesive layer; and a release liner having at least one surface comprising a microstructured surface that comprises an array of microstructures, where the microstructured surface is in contact with the second major surface of the second siloxane-based pressure sensitive adhesive layer, and wherein the first surface energy is lower than the second surface energy.

Embodiment 2 is the dual-sided adhesive article of Embodiment 1, wherein the microstructures of the microstructured surface of the second siloxane-based pressure sensitive adhesive layer are unstable when not in contact with the microstructured release liner, and disappear over time when in contact with a substrate.

Embodiment 3 is the dual-sided adhesive article of Embodiment 1 or 2, wherein the first crosslinked pressure sensitive adhesive layer and the second siloxane-based pressure sensitive adhesive layer are optically clear.

Embodiment 4 is the dual-sided adhesive article of any of Embodiments 1-3, wherein the first crosslinked pressure sensitive adhesive layer comprises ionic crosslinks, chemical crosslinks, or a combination thereof.

Embodiment 5 is the dual-sided adhesive article of any of Embodiments 1-4, wherein the first crosslinked pressure sensitive adhesive layer comprises a (meth)acrylate based pressure sensitive adhesive, a rubber-based pressure sensitive adhesive, or a combination thereof.

Embodiment 6 is the dual-sided adhesive article of any of Embodiments 1-5, wherein the first crosslinked pressure sensitive adhesive layer is formed from an adhesive composition comprising: a pressure sensitive adhesive component comprising at least one copolymer prepared from a mixture of at least one alkyl (meth)acrylate monomer, and at least one free radically polymerizable monomer comprising acid or base functionality; a high Tg polymer with a glass transition temperature of greater than 20° C. and a number average molecular weight of greater than about 100,000 Daltons, wherein the high Tg polymer is a (meth)acrylate copolymer comprising at least one free radically polymerizable monomer comprising acid or base functionality; and a crosslinker; wherein the functionality of the pressure sensitive adhesive component and the high Tg polymer from an acid-base interaction when mixed.

Embodiment 7 is the dual-sided adhesive article of any of Embodiments 1-6, wherein the siloxane-based pressure sensitive adhesive layer comprises a polydiorganosiloxane block copolymer comprising urea linkages, urethane linkages, amide linkages, oxamide linkages, or a combination thereof.

Embodiment 8 is the dual-sided adhesive article of Embodiment 7, wherein the polydiorganosiloxane block copolymer comprises a polydiorganosiloxane polyoxamide copolymer.

Embodiment 9 is the dual-sided adhesive article of any of Embodiments 1-8, wherein the first crosslinked pressure sensitive adhesive layer has a first thickness and the second siloxane-based adhesive layer has a second thickness, wherein the first thickness is greater than the second thickness, and wherein total adhesive thickness of the article comprises the sum of the first thickness and the second thickness.

Embodiment 10 is the dual-sided adhesive article of Embodiment 9, wherein the ratio of the first thickness to the second thickness is in the range of 2:1 to 10:1.

Embodiment 11 is the dual-sided adhesive article of any of Embodiments 9-10, wherein the second thickness ranges from 2.5 micrometers to 60 micrometers.

Embodiment 12 is the dual-sided adhesive article of any of Embodiments 1-11, wherein the microstructures on the microstructured surface have a height of equal to or less than the thickness of the second siloxane-based pressure sensitive adhesive layer.

Embodiment 13 is the dual-sided adhesive article of any of Embodiments 1-12, further comprising a second release liner in contact with the first major surface of the first crosslinked pressure sensitive adhesive layer.

Embodiment 14 is the dual-sided adhesive article of Embodiment 13, wherein the second release liner comprises a microstructured release liner comprising at least one microstructured surface that comprises an array of microstructures, where the microstructured surface is in contact with the first major surface of the first crosslinked pressure sensitive adhesive layer.

Also disclosed are embodiments of methods of preparing adhesive laminates. Embodiment 15 includes a method of preparing an adhesive laminate, the method comprising: providing a dual-sided adhesive article comprising: a first crosslinked pressure sensitive adhesive layer with a first major surface and a second major surface, and a first surface energy; a second siloxane-based pressure sensitive adhesive layer with a first major surface and a second major surface, a second surface energy, wherein the first major surface of the second siloxane-based pressure sensitive adhesive layer is in contact with the second major surface of the first crosslinked pressure sensitive adhesive layer; and a release liner having at least one surface comprising a microstructured surface that comprises an array of microstructures, where the microstructured surface is in contact with the second major surface of the second siloxane-based pressure sensitive adhesive layer, and wherein the first surface energy is lower than the second surface energy; removing the microstructured release liner from the second major surface of the second siloxane-based pressure sensitive adhesive layer; and contacting the exposed second major surface of the second siloxane-based pressure sensitive adhesive layer, which comprises a microstructured surface, to a first substrate.

Embodiment 16 is the method of Embodiment 15, wherein the microstructures of the microstructured surface of the second siloxane-based pressure sensitive adhesive layer are unstable when not in contact with the microstructured release liner, and disappear over time when in contact with the first substrate.

Embodiment 17 is the method of any of Embodiments 15-16, further comprising contacting a second substrate to the first major surface of the first crosslinked pressure sensitive adhesive layer.

Embodiment 18 is the method of any of Embodiments 15-17, wherein providing a dual-sided adhesive article comprises: forming a first crosslinked pressure sensitive adhesive layer comprising a first major surface and second major surface; coating a mixture comprising the second siloxane-based pressure sensitive adhesive and at least one solvent onto the second major surface of the first crosslinked pressure sensitive adhesive layer; drying the mixture comprising the second siloxane-based pressure sensitive adhesive and at least one solvent to form the second siloxane-based pressure sensitive adhesive layer comprising a first major surface and a second major surface wherein the first major surface is in contact with the second major surface of the first crosslinked pressure sensitive adhesive layer; and contacting a release liner to the second major surface of the second siloxane-based pressure sensitive adhesive layer, wherein the release liner comprises: either a microstructured release liner comprising at least one microstructured surface that comprises an array of microstructures, where the microstructured surface is in contact with the second major surface of the second siloxane-based pressure sensitive adhesive layer; or a release liner comprising a first major surface and a second major surface where the first major surface is in contact with the second major surface of the second siloxane-based pressure sensitive adhesive layer and wherein both the first and the second major surfaces are flat, and contacting the second major surface of the release liner to a microstructuring tool which impresses a microstructured pattern through the release liner and into at least the second siloxane-based pressure sensitive adhesive layer.

Embodiment 19 is the method of any of embodiments 15-16, wherein providing a dual-sided adhesive article comprises a multilayer coating method comprising: providing a first coating fluid; providing a second coating fluid; moving a release liner along a path through a coating station; flowing the first coating fluid at a rate sufficient to form a continuous flowing layer towards the substrate; flowing the second coating fluid onto the continuous flowing layer thereby forming a composite flowing layer; contacting the substrate with the composite flowing layer such that the second coating fluid is interposed between the continuous flowing layer and the substrate; forming the composite flowing layer into a film after the composite flowing layer contacts the substrate, the film comprising a first coating layer formed from the first coating fluid and a second coating layer formed from the second coating fluid, wherein the first coating layer comprises a crosslinked pressure sensitive adhesive layer, and the second coating layer comprises a siloxane-based pressure sensitive adhesive layer; and contacting the exposed surface of the release liner to a microstructuring tool and pressing the microstructured pattern of the microstructuring tool through the release liner and into at least the second coating layer.

Embodiment 20, is the method of Embodiment 19, wherein the surface tension of the second coating fluid is less than the surface tension of the first coating fluid.

Embodiment 21 is the method of any of Embodiments 19-20, wherein the first coating fluid comprises a crosslinkable pressure sensitive adhesive.

Embodiment 22 is the method of any of Embodiments 19-21, wherein the second coating fluid comprises a siloxane-based pressure sensitive adhesive.

Embodiment 23 is the method of any of Embodiments 19-22, wherein one or both of the first and second coating fluids comprises at least one solvent.

Embodiment 24 is the method of any of Embodiments 19-23, wherein forming the composite flowing layer into a film comprises drying and or curing.

Embodiment 25 is the method of any of embodiments 15-16, wherein providing a dual-sided adhesive article comprises a multilayer coating method comprising: providing a first coating fluid; providing a second coating fluid; moving a release liner along a path through a coating station; flowing the first coating fluid at a rate sufficient to form a continuous flowing layer towards the substrate; flowing the second coating fluid onto the continuous flowing layer thereby forming a composite flowing layer; contacting the substrate with the composite flowing layer such that the second coating fluid is interposed between the continuous flowing layer and the substrate; forming the composite flowing layer into a film after the composite flowing layer contacts the substrate, the film comprising a coating layer formed from the first coating fluid and a second coating layer formed from the second coating fluid, wherein the first coating layer comprises a siloxane-based pressure sensitive adhesive layer, and the second coating layer comprises a crosslinked pressure sensitive adhesive layer; and laminating a second release liner onto the exposed surface of the first coating layer, wherein the second release liner comprises a release liner with a microstructured surface with the microstructured surface in contact with the surface of the first coating layer, or the second release liner comprises a flat release liner that after lamination is contacted to a microstructuring tool and the pattern of the microstructuring tool is pressed through the release liner and into at least the first coating layer.

Embodiment 26 is the method of Embodiment 25, wherein the second coating fluid has a surface tension that is greater than that of the first coating fluid.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wisconsin unless otherwise noted. The following abbreviations are used: lb=pounds; Pa=Pascals; fpm=feet per minute. The terms "weight %", "% by weight", and "wt %" are used interchangeably.

| Table of Abbreviations | |
|---|---|
| Abbreviation or Trade Designation | Description |
| Adhesive Laminate-1 | 3M Optically Clear Adhesive 8142, adhesive thickness 51 micrometers (2 mils) between 2 release liners, used as obtained. Commercially available from 3M Company, St. Paul, MN. |
| Adhesive Laminate-2 | 3M Scotch 2-850 tape, used as obtained. Commercially available from 3M Company, St. Paul, MN. |
| SE | Silicone Elastomer coating solution prepared as described below in Preparative Example P-1. |
| Tackifier | SR 1000 MQ resin, commercially available from Momentive Specialty Chemicals, Columbus, OH. |
| Liner-1 | Silicone coated unstructured polyethylene terephthalate (PET) release liner. |
| Liner-2 | A polyethylene coated polyethylene terephthalate release liner with square pyramidal structures, pitch of 200 micrometers and a depth of 12 micrometers, sidewalls have an angle of about 8°. |
| Solution A | A coatable fluid of an acrylate pressure sensitive adhesive in a mixture of toluene and isopropanol at 20% solids. |
| Solution B | A coatable fluid of SE. |

PREPARATORY EXAMPLE P-1

Silicone Elastomer Coating Solution

A polydimethyl siloxane oxamide elastomer prepared from a polydimethyl siloxane diamine with a molecular weight of 25,000 Daltons was made according to the methods in US Patent Publication No. 2012/0271025. Ten percent by weight Tackifier was added to the silicone elastomer.

The combined silicone elastomer and Tackifier were dissolved in a mixture of toluene and 2-propanol at a weight ratio of 70 parts toluene and 30 parts 2-propanol to give a final solids content of 15% by weight.

Example 1

A sample of Adhesive Laminate-1 was obtained and one liner was removed. The exposed surface was coated with the SE coating solution using a #11 Mayer rod. The solvent was removed by placing the sample in an oven at 70° C. for 10 minutes. After the sample was removed from the oven, the two layers were flat, clear, and colorless. Liner-2 was laminated to the coated surface using a laminator. Liner-2 was then removed and the adhesive surface structure was observed, the inverse of the pattern of the liner. After 24 hours exposure to ambient conditions in the laboratory, the embossed surface structures were no longer visible and the adhesive layers had returned to their initial flat, clear, and colorless condition.

Example 2

A sample of Adhesive Laminate-1 was obtained and one liner was removed. The exposed surface was coated with the SE coating solution using a #18 Mayer rod. The solvent was removed by placing the sample in an oven at 70° C. for 10 minutes. After being removed from the oven, the two layers were flat, clear, and colorless. Liner-2 was laminated to the coated surface using a laminator. Liner-2 was then removed and the adhesive surface structure was observed, the inverse of the pattern of the liner. After 24 hours exposure to ambient conditions in the laboratory, the embossed surface structures were no longer visible and the adhesive layers had returned to their initial flat, clear, and colorless condition.

Example 3

A sample of Adhesive Laminate-1 was obtained and one liner was removed. The exposed surface was coated with the SE coating solution using a #22 Mayer rod. The solvent was removed by placing the sample in an oven at 70° C. for 10 minutes. After being removed from the oven, the two layers were flat, clear, and colorless. Liner-2 was laminated to the coated surface using a laminator. Liner-2 was then removed and the adhesive surface structure was observed, the inverse of the pattern of the liner. After 24 hours exposure to ambient conditions in the laboratory, the embossed surface structures were no longer visible and the adhesive layers had returned to their initial flat, clear, and colorless condition.

Example 4

A sample of Adhesive Laminate-2 was obtained. The exposed surface was coated with the SE coating solution using a #11 Mayer rod. The solvent was removed by placing the sample in an oven at 70° C. for 10 minutes. After being removed from the oven, the two layers were flat, clear, and colorless. Liner-2 was laminated to the coated surface using a laminator. Liner-2 was then removed and the adhesive surface structure was observed, the inverse of the pattern of the liner. After 24 hours exposure to ambient conditions in the laboratory, the embossed surface structures were no longer visible and the adhesive layers had returned to their initial flat, clear, and colorless condition.

Example 5

A sample of Adhesive Laminate-2 was obtained. The exposed surface was coated with the silicone elastomer coating solution using a #18 Mayer rod. The solvent was removed by placing the sample in an oven at 70° C. for 10 minutes. After being removed from the oven, the two layers were flat, clear, and colorless. Liner-2 was laminated to the coated surface using a laminator. Liner-2 was then removed and the adhesive surface structure was observed, the inverse of the pattern of the liner. After 24 hours exposure to ambient conditions in the laboratory, the embossed surface structures were no longer visible and the adhesive layers had returned to their initial flat, clear, and colorless condition.

Example 6

Two coating solutions were prepared, Solution A and Solution B. Liner 1 was selected as the substrate. The solutions were applied simultaneously via a multilayer slot-type coating die at 8 inches wide and at 30 fpm, with Solution A corresponding with the bottom die slot and bottom coating layer, and Solution B corresponding to the top die slot and top coating. Solution flowrates were adjusted to maintain a top layer dry thickness of 6.7 micrometers and a bottom layer dry thickness of 20 micrometers. Subsequently, the coated film traversed through a 15 ft open air webspan to a conventional air flotation 3-zone oven, with zone temperatures set at 180, 200, and 220° F. (82, 93, and 104° C.) respectively. Upon exiting the oven, the dried and cured coating entered a laminator, where a Release Liner-1 was applied prior to the entire article being wound into a stock roll.

The construction was embossed through the PET liner in a heated nip with a pressure of 13.8 MPa (2,000 lbs), and with temperature of the tool roll held at 127° C. (260° F.). The tool roll was a nickel plated copper tool roll with height of structures is 203 micrometers (8 mils); the width of structures is 102 micrometers (4 mils); the pitch of the structures, which is the distance between the center of one structure and the center of its nearest neighbor) is 70 lines per 2.54 centimeters (70 lines per inch); and the draft angle is 10°. The backup roll was a black silicone roll, 90-95 durometer (RotaDyne, Darien, Ill.), held at 16° C. Samples were then laminated to an iPad surface. One set of samples had hand pressure applied (rubbed) and the other set was applied without pressure (non-rubbed). Images were taken at 1 hour and 24 hrs after application to show the extent of pattern dissipation with time and application. The images were then rated for the presence of structures on a 1 to 5 scale where 1 indicates that the structures are fully present, 5 indicates that no structures are visible. The data are summarized in Table 1.

TABLE 1

| Example 6 Rubbed | | | Example 6 Non-rubbed | | |
|---|---|---|---|---|---|
| Visual Inspection Rating Initial | Visual Inspection Rating After 1 hour | Visual Inspection Rating After 24 hours | Visual Inspection Rating Initial | Visual Inspection Rating After 1 hour | Visual Inspection Rating After 24 hours |
| 5 | 5 | 5 | 1 | 3 | 4 |

What is claimed is:
1. A dual-sided adhesive article comprising:
   a first crosslinked pressure sensitive adhesive layer with a first major surface and a second major surface, and a first surface energy;

a second siloxane-based pressure sensitive adhesive layer comprising a siloxane elastomeric polymer, the second siloxane-based pressure sensitive adhesive layer with a first major surface and a second major surface, and a second surface energy, wherein the first major surface of the second siloxane-based pressure sensitive adhesive layer is in contact with the second major surface of the first crosslinked pressure sensitive adhesive layer; and a release liner having at least one surface comprising a microstructured surface that comprises an array of microstructures, where the microstructured surface is in contact with the second major surface of the second siloxane-based pressure sensitive adhesive layer, and wherein the first surface energy is lower than the second surface energy; and wherein the first crosslinked pressure sensitive adhesive layer and the second siloxane-based pressure sensitive adhesive layer are optically clear, and wherein the first and second pressure sensitive adhesive layers have sufficient cohesive strength to be cleanly removeable from an adherend.

2. The dual-sided adhesive article of claim 1, wherein the first crosslinked pressure sensitive adhesive layer comprises ionic crosslinks, chemical crosslinks, or a combination thereof.

3. The dual-sided adhesive article of claim 1, wherein the first crosslinked pressure sensitive adhesive layer comprises a (meth)acrylate based pressure sensitive adhesive, a rubber-based pressure sensitive adhesive, or a combination thereof.

4. The dual-sided adhesive article of claim 3, wherein the first crosslinked pressure sensitive adhesive layer is formed from an adhesive composition comprising:

a pressure sensitive adhesive component comprising at least one copolymer prepared from a mixture of at least one alkyl (meth)acrylate monomer, and at least one free radically polymerizable monomer comprising acid or base functionality;

a high Tg polymer with a glass transition temperature of greater than 20° C. and a number average molecular weight of greater than about 100,000 Daltons, wherein the high Tg polymer is a (meth)acrylate copolymer comprising at least one free radically polymerizable monomer comprising acid or base functionality; and a crosslinker;

wherein the functionality of the pressure sensitive adhesive component and the high Tg polymer from an acid-base interaction when mixed.

5. The dual-sided adhesive article of claim 1, wherein the siloxane-based pressure sensitive adhesive layer comprises a polydiorganosiloxane block copolymer comprising urea linkages, urethane linkages, amide linkages, oxamide linkages, or a combination thereof.

6. The dual-sided adhesive article of claim 5, wherein the polydiorganosiloxane block copolymer comprises a polydiorganosiloxane polyoxamide copolymer.

7. The dual-sided adhesive article of claim 1, wherein the first crosslinked pressure sensitive adhesive layer has a first thickness and the second siloxane-based adhesive layer has a second thickness, wherein the first thickness is greater than the second thickness, and wherein total adhesive thickness of the article comprises the sum of the first thickness and the second thickness.

8. The dual-sided adhesive article of claim 7, wherein the ratio of the first thickness to the second thickness is in the range of 2:1 to 10:1.

9. The dual-sided adhesive article of claim 7, wherein the second thickness ranges from 2.5 micrometers to 60 micrometers.

10. The dual-sided adhesive article of claim 1, wherein the microstructures on the microstructured surface have a height of equal to or less than the thickness of the second siloxane-based pressure sensitive adhesive layer.

11. The dual-sided adhesive article of claim 1, further comprising a second release liner in contact with the first major surface of the first crosslinked pressure sensitive adhesive layer.

12. The dual-sided adhesive article of claim 11, wherein the second release liner comprises a microstructured release liner comprising at least one microstructured surface that comprises an array of microstructures, where the microstructured surface is in contact with the first major surface of the first crosslinked pressure sensitive adhesive layer.

13. A method of preparing an adhesive laminate, the method comprising:

providing a dual-sided adhesive article comprising:

a first crosslinked pressure sensitive adhesive layer with a first major surface and a second major surface, and a first surface energy;

a second siloxane-based pressure sensitive adhesive layer comprising a siloxane elastomeric polymer, the second siloxane-based pressure sensitive adhesive layer with a first major surface and a second major surface, a second surface energy, wherein the first major surface of the second siloxane-based pressure sensitive adhesive layer is in contact with the second major surface of the first crosslinked pressure sensitive adhesive layer, wherein the first and second pressure sensitive adhesive layers have sufficient cohesive strength to be cleanly removeable from an adherend; and a release liner having at least one surface comprising a microstructured surface that comprises an array of microstructures, where the microstructured surface is in contact with the second major surface of the second siloxane-based pressure sensitive adhesive layer, and wherein the first surface energy is lower than the second surface energy, and wherein the first crosslinked pressure sensitive adhesive layer and the second siloxane-based pressure sensitive adhesive layer are optically clear;

removing the microstructured release liner from the second major surface of the second siloxane-based pressure sensitive adhesive layer; and contacting the exposed second major surface of the second siloxane-based pressure sensitive adhesive layer, which comprises a microstructured surface, to a first substrate.

14. The method of claim 13, wherein the microstructures of the microstructured surface of the second siloxane-based pressure sensitive adhesive layer are unstable when not in contact with the microstructured release liner, and disappear over time when in contact with the first substrate.

15. The method of claim 13, further comprising contacting a second substrate to the first major surface of the first crosslinked pressure sensitive adhesive layer.

16. The method of claim 13, wherein providing a dual-sided adhesive article comprises:

forming a first crosslinked pressure sensitive adhesive layer comprising a first major surface and second major surface;

coating a mixture comprising the second siloxane-based pressure sensitive adhesive and at least one solvent onto the second major surface of the first crosslinked pressure sensitive adhesive layer;

drying the mixture comprising the second siloxane-based pressure sensitive adhesive and at least one solvent to form the second siloxane-based pressure sensitive adhesive layer comprising a first major surface and a second major surface wherein the first major surface is in contact with the second major surface of the first crosslinked pressure sensitive adhesive layer; and contacting a release liner to the second major surface of the second siloxane-based pressure sensitive adhesive layer, wherein the release liner comprises:

either a microstructured release liner comprising at least one microstructured surface that comprises an array of microstructures, where the microstructured surface is in contact with the second major surface of the second siloxane-based pressure sensitive adhesive layer; or a release liner comprising a first major surface and a second major surface where the first major surface is in contact with the second major surface of the second siloxane-based pressure sensitive adhesive layer and wherein both the first and the second major surfaces are flat, and contacting the second major surface of the release liner to a microstructuring tool which impresses a microstructured pattern through the release liner and into at least the second siloxane-based pressure sensitive adhesive layer.

17. The method of claim 13, wherein providing a dual-sided adhesive article comprises a multilayer coating method comprising:

providing a first coating fluid;
providing a second coating fluid;
moving a release liner along a path through a coating station;
flowing the first coating fluid at a rate sufficient to form a continuous flowing layer towards the substrate;
flowing the second coating fluid onto the continuous flowing layer thereby forming a composite flowing layer;
contacting the substrate with the composite flowing layer such that the second coating fluid is interposed between the continuous flowing layer and the substrate;
forming the composite flowing layer into a film after the composite flowing layer contacts the substrate, the film comprising a first coating layer formed from the first coating fluid and a second coating layer formed from the second coating fluid, wherein the first coating layer comprises a crosslinked pressure sensitive adhesive layer, and the second coating layer comprises a siloxane-based pressure sensitive adhesive layer; and
contacting the exposed surface of the release liner to a microstructuring tool and pressing the microstructured pattern of the microstructuring tool through the release liner and into at least the second coating layer.

18. The method of claim 17, wherein the first coating fluid comprises a crosslinkable pressure sensitive adhesive.

19. The method of claim 17, wherein the second coating fluid comprises a siloxane-based pressure sensitive adhesive.

20. The method of claim 17, wherein one or both of the first and second coating fluids comprises at least one solvent.

21. The method of claim 17, wherein forming the composite flowing layer into a film comprises drying and or curing.

22. The method of claim 13, wherein providing a dual-sided adhesive article comprises a multilayer coating method comprising:

providing a first coating fluid;
providing a second coating fluid;
moving a release liner along a path through a coating station;
flowing the first coating fluid at a rate sufficient to form a continuous flowing layer towards the substrate;
flowing the second coating fluid onto the continuous flowing layer thereby forming a composite flowing layer;
contacting the substrate with the composite flowing layer such that the second coating fluid is interposed between the continuous flowing layer and the substrate;
forming the composite flowing layer into a film after the composite flowing layer contacts the substrate, the film comprising a coating layer formed from the first coating fluid and a second coating layer formed from the second coating fluid, wherein the first coating layer comprises a siloxane-based pressure sensitive adhesive layer, and the second coating layer comprises a crosslinked pressure sensitive adhesive layer; and
laminating a second release liner onto the exposed surface of the first coating layer, wherein the second release liner comprises a release liner with a microstructured surface with the microstructured surface in contact with the surface of the first coating layer, or the second release liner comprises a flat release liner that after lamination is contacted to a microstructuring tool and the pattern of the microstructuring tool is pressed through the release liner and into at least the first coating layer.

* * * * *